United States Patent
Pu et al.

(10) Patent No.: US 9,986,248 B2
(45) Date of Patent: May 29, 2018

(54) PALETTE MODE CODING FOR VIDEO CODING

(71) Applicant: QUALCOMM Incorporated, San Diego, CA (US)

(72) Inventors: Wei Pu, Pittsburgh, PA (US); Marta Karczewicz, San Diego, CA (US); Rajan Laxman Joshi, San Diego, CA (US); Feng Zou, San Diego, CA (US); Vadim Seregin, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 244 days.

(21) Appl. No.: 15/004,508

(22) Filed: Jan. 22, 2016

(65) Prior Publication Data
US 2016/0227239 A1    Aug. 4, 2016

Related U.S. Application Data

(60) Provisional application No. 62/109,568, filed on Jan. 29, 2015.

(51) Int. Cl.
*H04N 19/70* (2014.01)
*H04N 19/176* (2014.01)
*H04N 19/593* (2014.01)

(52) U.S. Cl.
CPC ......... *H04N 19/176* (2014.11); *H04N 19/593* (2014.11); *H04N 19/70* (2014.11)

(58) Field of Classification Search
CPC ..... H04N 19/176; H04N 19/593; H04N 19/70
See application file for complete search history.

(56) References Cited

U.S. PATENT DOCUMENTS

| | | | |
|---|---|---|---|
| 2015/0016501 A1 | 1/2015 | Guo et al. | |
| 2015/0181223 A1* | 6/2015 | Gisquet | H04N 19/593 375/240.12 |
| 2015/0281728 A1 | 10/2015 | Karczewicz et al. | |
| 2016/0309172 A1* | 10/2016 | Laroche | H04N 19/593 |
| 2017/0111651 A1* | 4/2017 | Chuang | H04N 19/593 |

(Continued)

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

(Continued)

*Primary Examiner* — Christopher Findley
(74) *Attorney, Agent, or Firm* — Shumaker & Sieffert, P.A.

(57) ABSTRACT

Receiving a plurality of syntax elements that are indicative of a palette that was used to encode a block of video data, the plurality of syntax elements including a first syntax element that indicates a number of palette values for the palette that are explicitly signaled in the encoded video bitstream, wherein the first syntax element is encoded using one or more Golomb codes such that the length of the encoded first syntax element is less than or equal to a predetermined maximum number of bits, decoding the plurality of syntax elements, including decoding the first syntax element using the one or more Golomb codes, reconstructing the palette based on the decoded plurality of syntax elements, and decoding the block of video data using the reconstructed palette.

46 Claims, 9 Drawing Sheets

(56) References Cited

U.S. PATENT DOCUMENTS

2017/0318301 A1* 11/2017 Li .................. H04N 19/186

OTHER PUBLICATIONS

Joshi, et al., "HEVC Screen Content Coding Test Model 2 (SCM 2)", MPEG Meeting; Jul. 7-11, 2014; Sapporo, JP (Motion Picture Expert Group or ISO/IEC JTC1/SC29/WG11), No. N14706, Oct. 20, 2014, XP030021442, 11 pp.

Pu et al., "Non CE1: Palette Mode Syntax, Codeword, and Encoder Fixes," JCT-VC Meeting; Feb. 10-18, 2015; Geneva, CH (joint collaborative team on video Coding of ISO/IEC JTC1/SC29/WG11 and ITU-T SG.16); URL:http://wftp3.itu.int/av-arch/jctvc-site/, No. JCTVC-T0063r2, Jan. 31, 2015, XP030117186, 4 pp.

Pu et al., "Non CE1: Palette Mode Semantics, Codeword, and Encoder Fixes," JCT-VC Meeting; Feb. 10-18, 2015; Geneva, CH; (joint collaborative team on video coding of ISO/IEC JTC1/SC29/WG11 and ITU-T SG.16); URL:http://wftp3.itu.int/av-arch/jctvc-site/, No. JCTVC-T0063-v7, Feb. 12, 2015, XP030117187, 4 pp.

Joshi et al., "High Efficiency Video Coding (HEVC) Screen Content Coding: Draft 2," JCT-VC Meeting; Jun. 30-Jul. 9, 2014; (Joint collaborative team on video coding of ISO/IEC JTC1/SC29/WG11 and ITU-T SG.16); No. JCTVC-S1005, Dec. 10, 2014; 380 pp.

Ye et al., "Non CE6: Copy previous mode," JCT-VC Meeting; Oct. 17-24, 2014; (Joint collaborative team on video coding of ISO/IEC JTC1/SC29/WG11 and ITU-T SG.16); No. JCTVC-S0120, Oct. 17, 2014; 7 pp.

Wang et al., "Non-CE6: 2-D Index Map Coding of Palette Mode in HEVC SCC," JCT-VC Meeting; Oct. 17-24, 2014 (Joint collaborative team on video coding of ISO/IEC JTC1/SC29/WG11 and ITU-T SG.16); No. JCTVC-S0151, Version 3; Oct. 17, 2014; 4 pp.

Guo et al., "RCE4: Summary report of HEVC Range Extensions Core Experiments 4 (RCE4) on palette coding for screen content," JCT-VC Meeting (Joint collaborative team on video coding of ISO/IEC JTC1/SC29/WG11 and ITU-T SG.16); No. JCTVC-P0035, Jan. 9, 2014; 8 pp.

Guo et al., "RCE4: Test 1. Major-color-based screen content coding," JCT-VC Meeting; Jan. 9-17, 2014 (Joint collaborative team on video coding of ISO/IEC JTC1/SC29/WG11 and ITU-T SG.16); No. JCTVC-P0108, Jan. 3, 2014; 12 pp.

Guo et al., "RCE4: Results of Test 2 on Palette Mode for Screen Content Coding," JCT-VC Meeting; Jan. 9-17, 2014 (Joint collaborative team on video coding of ISO/IEC JTC1/SC29/WG11 and ITU-T SG.16); No. JCTVC-P0198; version 3; Jan. 8, 2014; 13 pp.

Gisquet et al., "AhG10: palette predictor stuffing," JCT-VC Meeting; Mar. 27-Apr. 4, 2014 (Joint collaborative team on video coding of ISO/IEC JTC1/SC29/WG11 and ITU-T SG.16); No. JCTVC-Q0063; Version 2; Mar. 29, 2014; 3 pp.

Sun et al., "CE6-related: Cross-CU palette colour index prediction," JCT-VC Meeting; Oct. 17-24, 2014 (Joint collaborative team on video coding of ISO/IEC JTC1/SC29/WG11 and ITU-T SG.16); No. JCTVC-S0079; version 3; Oct. 18, 2014; 6 pp.

Kim et al., "CE6-related: Enabling copy above mode prediction at the boundary of CU," JCT-VC Meeting; Oct. 17-24, 2014 (Joint collaborative team on video coding of ISO/IEC JTC1/SC29/WG11 and ITU-T SG.16); No. JCTVC-S0114; version 3; Oct. 18, 2014; 7 pp.

Pu et al., "AHG10: Suggested Software for Palette Coding based on RExt6.0," JCT-VC Meeting; Mar. 27-Apr. 4, 2014 (Joint collaborative team on video coding of ISO/IEC JTC1/SC29/WG11 and ITU-T SG.16); No. JCTVC-Q0094; Mar. 19, 2014; 4 pp.

Zhao et al., "Non-CE6: Simplified palette size coding," JCT-VC Meeting; Oct. 17-24, 2014 (Joint collaborative team on video coding of ISO/IEC JTC1/SC29/WG11 and ITU-T SG.16); No. JCTVC-S0134; Oct. 15, 2014; 5 pp.

International Search Report from International Application No. PCT/US2016/014760, dated Mar. 30, 2016, 14 pp.

Response to Written Opinion dated Mar. 30, 2016 from International Application No. PCT/US2016/014760, filed on Jun. 8, 2016, 22 pp.

Second Written Opinion from International Application No. PCT/US2016/014760, dated Jul. 18, 2016, 8 pp.

Response to Second Written Opinion dated Jul. 18, 2016, from International Application No. PCT/US2016/014760, filed on Sep. 16, 2016, 23 pp.

ITU-T H.265, Series H: Audiovisual and Multimedia Systems, Infrastructure of audiovisual services—Coding of moving video, High efficiency video coding, The International Telecommunication Union. Apr. 2013, 317 pp.

Joshi, et al., "CE5: Summary report of core experiment 5 on investigation of maximum palette size and maximum palette predictor size," JCT-VC Meeting; Oct. 17-24, 2014, (Joint Collaborative Team on Video Coding JCT-VC of ITU-T SG 16 WP 3 and ISO/IEC JTC 1/SC 29/WG 11); document No. JCTVC-S0025, Oct. 17, 2014, 5 pp.

Yu et al., "Common test conditions for screen content coding," JCT-VC Meeting; Oct. 17-24, 2014; (Joint Collaborative Team on Video Coding JCT-VC of ITU-T SG 16 WP 3 and ISO/IEC JTC 1/SC 29/WG 11); document No. JCTVC-S1015; Nov. 22, 2014; 6 pp.

Lai, et al., "Description of core experiment 1 (CE1): Improvements of palette mode," JCT-VC Meeting; Oct. 17-24, 2014; (Joint Collaborative Team on Video Coding JCT-VC of ITU-T SG 16 WP 3 and ISO/IEC JTC 1/SC 29/WG 11); document No. JCTVC-S1101; Nov. 22, 2014; 5 pp.

International Preliminary Report on Patentability—PCT/US2016/014760, The International Bureau of WIPO—Geneva, Switzerland, May 3, 2017.

* cited by examiner

PREDICTION PALETTE BUFFER
210

| ENTRY INDEX | PIXEL VALUE |
|---|---|
| 1 | VALUE A |
| 2 | VALUE B |
| 3 | VALUE C |
| 4 | VALUE D |
| 5 | VALUE E |
| 6 | VALUE F |
| 7 | VALUE G |
| 8 | VALUE H |
| 9 | VALUE I |
| 10 | VALUE J |
| 11 | VALUE K |
| 12 | VALUE L |
| 13 | VALUE M |
| ... | ... |

CURRENT PALETTE
220

| ENTRY INDEX | PIXEL VALUE |
|---|---|
| 1 | VALUE A |
| 2 | VALUE B |
| 3 | VALUE E |
| 4 | VALUE I |
| 5 | NEW VALUE |
| 6 | NEW VALUE |
| 7 | NEW VALUE |
| 8 | NEW VALUE | b = [1100100010000]

FIG. 5

PALETTE MODE CODING FOR VIDEO CODING

This application claims the benefit of U.S. Provisional Application No. 62/109,568 filed Jan. 29, 2015, the entire contents of which are incorporated by reference herein.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

This disclosure relates to video encoding and decoding techniques. In particular, this disclosure describes techniques for encoding and decoding video data with a palette-based coding mode. In a palette-based coding mode, pixel values for a block of video data may be coded relative to a palette of color values associated with the block of video data. The palette of color values may be determined by a video encoder and may contain the color values that are most common for a particular block. The video encoder may assign an index into the palette of color values to each pixel in the block of video data, and signal such an index to a video decoder in an encoded video bitstream. The video decoder may then use the index into the palette to determine what color value to use for a particular pixel in the block.

In addition to signaling indices in the palette, a video encoder may also transmit the palette itself in the encoded video bitstream. Techniques for transmitting the palette may include explicitly signaling the palette values, as well as predicting the palette entries for a current block from palette entries from one or more previously coded blocks. This disclosure describes techniques for coding palettes, including techniques for coding syntax elements related to palette coding and/or palette prediction.

In one example of the disclosure, a method of decoding video data comprises receiving a block of video data in an encoded video bitstream, the block of video data having been encoded using a palette-based coding mode, receiving a plurality of syntax elements that are indicative of a palette that was used to encode the block of video data, the plurality of syntax elements including a first syntax element that indicates a number of a palette values for the palette that are explicitly signaled in the encoded video bitstream, wherein the first syntax element is encoded using one or more Golomb codes such that the length of the encoded first syntax element is less than or equal to a predetermined maximum number of bits, decoding the plurality of syntax elements, including decoding the first syntax element using the one or more Golomb codes, reconstructing the palette based on the decoded plurality of syntax elements, and decoding the block of video data using the reconstructed palette.

In another example of the disclosure, a method of encoding video data comprises encoding a block of video data using a palette-based coding mode and a palette, generating a plurality of syntax elements that are indicative of the palette that was used to encode the block of video data, the plurality of syntax elements including a first syntax element that indicates a number of a palette values for the palette that are explicitly signaled in the encoded video bitstream, encoding the first syntax element using one or more Golomb codes such that the length of the encoded first syntax element is less than or equal to a predetermined maximum number of bits, and including the plurality of syntax elements in an encoded video bitstream.

In another example of the disclosure, an apparatus configured to decode video data comprises a memory configured to store an encoded video bitstream, and a video decoder configured to receive a block of video data in the encoded video bitstream, the block of video data having been encoded using a palette-based coding mode, receive a plurality of syntax elements that are indicative of a palette that was used to encode the block of video data, the plurality of syntax elements including a first syntax element that indicates a number of a palette values for the palette that are explicitly signaled in the encoded video bitstream, wherein the first syntax element is encoded using the one or more Golomb codes such that the length of the encoded first syntax element is less than or equal to a predetermined maximum number of bits, decode the plurality of syntax elements, including decoding the first syntax element using one or more Golomb codes, reconstruct the palette based on the decoded plurality of syntax elements, and decode the block of video data using the reconstructed palette.

In another example of the disclosure, an apparatus configured to encode video data comprises a memory configured to store a block of video data, and a video encoder configured to encode the block of video data using a palette-based coding mode and a palette, generate a plurality of syntax elements that are indicative of the palette that was used to encode the block of video data, the plurality of syntax elements including a first syntax element that indicates a number of a palette values for the palette that are explicitly signaled in the encoded video bitstream, encode the first syntax element using one or more Golomb codes such that the length of the encoded first syntax element is less than or equal to a predetermined maximum number of bits, and include the plurality of syntax elements in an encoded video bitstream.

In another example of the disclosure, an apparatus configured to decode video data comprises means for receiving a block of video data in an encoded video bitstream, the block of video data having been encoded using a palette-based coding mode, means for receiving a plurality of syntax elements that are indicative of a palette that was used to encode the block of video data, the plurality of syntax elements including a first syntax element that indicates a number of a palette values for the palette that are explicitly signaled in the encoded video bitstream, wherein the first syntax element is encoded using one or more Golomb codes such that the length of the encoded first syntax element is less than or equal to a predetermined maximum number of bits, means for decoding the plurality of syntax elements, including decoding the first syntax element using the one or more Golomb codes, means for reconstructing the palette based on the decoded plurality of syntax elements, and means for decoding the block of video data using the reconstructed palette.

In another example of the disclosure, an apparatus configured to encode video data comprises means for encoding a block of video data using a palette-based coding mode and a palette, means for generating a plurality of syntax elements that are indicative of the palette that was used to encode the block of video data, the plurality of syntax elements including a first syntax element that indicates a number of a palette values for the palette that are explicitly signaled in the encoded video bitstream, means for encoding the first syntax element using one or more Golomb codes such that the length of the encoded first syntax element is less than or equal to a predetermined maximum number of bits, and means for including the plurality of syntax elements in an encoded video bitstream.

In another example, this disclosure describes a computer-readable storage medium storing instructions that, when executed, cause one or more processors of a device configured to decode video data to receive a block of video data in an encoded video bitstream, the block of video data having been encoded using a palette-based coding mode, receive a plurality of syntax elements that are indicative of a palette that was used to encode the block of video data, the plurality of syntax elements including a first syntax element that indicates a number of a palette values for the palette that are explicitly signaled in the encoded video bitstream, wherein the first syntax element is encoded using one or more Golomb codes such that the length of the encoded first syntax element is less than or equal to a predetermined maximum number of bits, decode the plurality of syntax elements, including decoding the first syntax element using the one or more Golomb codes, reconstruct the palette based on the decoded plurality of syntax elements, and decode the block of video data using the reconstructed palette.

In another example, this disclosure describes a computer-readable storage medium storing instructions that, when executed, cause one or more processors of a device configured to encode video data to encode a block of video data using a palette-based coding mode and a palette, generate a plurality of syntax elements that are indicative of the palette that was used to encode the block of video data, the plurality of syntax elements including a first syntax element that indicates a number of a palette values for the palette that are explicitly signaled in the encoded video bitstream, encode the first syntax element using one or more Golomb codes such that the length of the encoded first syntax element is less than or equal to a predetermined maximum number of bits, and include the plurality of syntax elements in an encoded video bitstream.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a conceptual diagram illustrating an example palette prediction technique according to the techniques of the disclosure.

DETAILED DESCRIPTION

Figure 1:
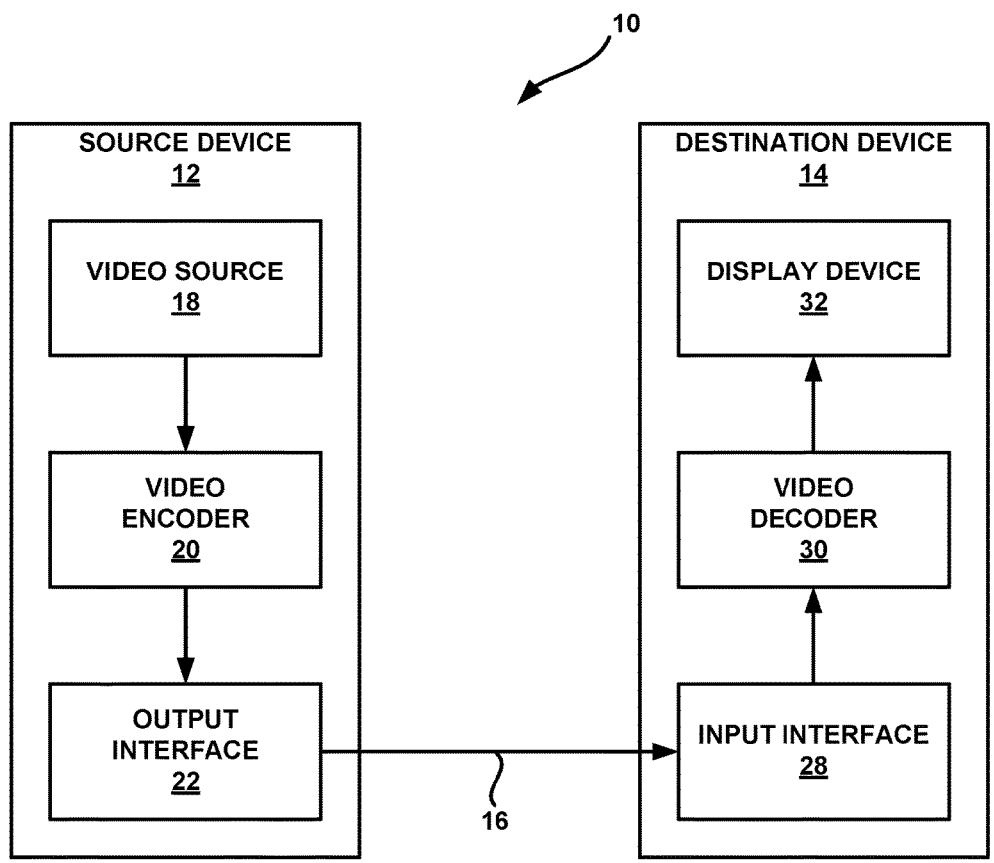
FIG. 1 is a block diagram illustrating an example video coding system that may utilize the techniques described in this disclosure.

This disclosure is related to the field of video coding, and more particularly to predicting or coding a block of video data in palette-based coding mode. In traditional video coding, images are assumed to be continuous-tone and spatially smooth. Based on these assumptions, various tools have been developed, such as block-based transform, filtering, etc., and such tools have shown good performance for natural content videos. In applications like remote desktop, collaborative work and wireless display, however, computer generated screen content (e.g., such as text or computer graphics) may be the dominant content to be compressed. This type of content tends to have discrete-tone, and features sharp lines and high-contrast object boundaries. The assumption of continuous-tone and smoothness may no longer apply for screen content, and thus traditional video coding techniques may not be efficient to compress video data including screen content.

This disclosure describes palette-based coding, which may be particularly suitable for the coding of screen content. For example, assuming that a particular area of video data has a relatively small number of colors, a video coder (e.g., a video encoder or video decoder) may form a so-called "palette" to represent the video data of the particular area. The palette may be expressed as a table of colors or pixel values representing the video data of the particular area (e.g., a given block). For example, the palette may include the most dominant pixel values in the given block. In some cases, the most dominant pixel values may include the one or more pixel values that occur most frequently within the block. Additionally, in some cases, a video coder may apply a threshold value to determine whether a pixel value is to be included as one of the most dominant pixel values in the block. According to various aspects of palette-based coding, the video coder may code index values indicative of one or more of the pixels values of the current block, instead of coding actual pixel values or their residuals for a current block of video data. In the context of palette-based coding, the index values indicate respective entries in the palette that are used to represent individual pixel values of the current block.

For example, the video encoder may encode a block of video data by determining the palette for the block (e.g., coding the palette explicitly, predicting the palette, or a combination thereof), locating an entry in the palette to represent one or more of the pixel values, and encoding the block with index values that indicate the entry in the palette used to represent the pixel values of the block. In some examples, the video encoder may signal the palette and/or the index values in an encoded bitstream. In turn, the video decoder may obtain, from an encoded bitstream, a palette for a block, as well as index values for the individual pixels of the block. The video decoder may relate the index values of the pixels to entries of the palette to reconstruct the various pixel values of the block.

In accordance with various examples discussed below, this disclosure describes techniques for improving the coding efficiency when coding blocks of video data with a palette-based coding mode. Examples of this disclosure include techniques for coding video data using a palette-based coding mode, and techniques for coding syntax elements related to the palette-based coding mode. In some examples, the techniques of this disclosure relate to coding syntax elements used by a video decoder to determine and/or reconstruct a palette for a block of video data.

In some examples, the palette-based coding techniques of this disclosure may be configured for use with one or more video coding standards. Some example video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In another example, the palette-based coding techniques may be configured for use with the High Efficiency Video Coding (HEVC). HEVC is a new video coding standard developed by the Joint Collaboration Team on Video Coding (JCT-VC) of ITU-T Video Coding Experts Group (VCEG) and ISO/IEC Motion Picture Experts Group (MPEG).

Recently, the design of HEVC has been finalized by the Joint Collaboration Team on Video Coding (JCT-VC) of ITU-T Video Coding Experts Group (VCEG) and ISO/IEC Motion Picture Experts Group (MPEG). The latest HEVC specification, referred to as HEVC Version 1 or HEVC1 hereinafter, is described in "ITU-T H.265 (V1)," which as of Mar. 24, 2015 is available from http://www.itu.int/ITU-T/recommendations/rec.aspx?rec=11885&lang=en. Document ITU-T H.265, SERIES H: AUDIOVISUAL AND MULTIMEDIA SYSTEMS, Infrastructure of Audiovisual Services—Coding of Moving Video, "High Efficiency Video Coding," April 2013 also describes the HEVC standard. A recent specification of Range extensions, referred to as RExt hereinafter, is described in "ITU-T H.265 (V2)," which as of Mar. 24, 2015 is available from http://www.itu.int/ITU-T/recommendations/rec.aspx?rec=12296&lang=en.

To provide more efficient coding of screen generated content, the JCT-VC is developing an extension to the HEVC standard, referred to as the HEVC Screen Content Coding (SCC) standard. A recent working draft of the HEVC SCC standard, referred to as "HEVC SCC Draft 2" or "WD2," is described in document JCTVC-S1005, R. Joshi and J. Xu, "HEVC screen content coding draft text 2," Joint Collaborative Team on Video Coding (JCT-VC) of ITU-T SG 16 WP 3 and ISO/IEC JTC 1/SC 29/WG 11, 19$^{th}$ Meeting: Strasbourg, FR, 17-24 Oct. 2014.

FIG. 1 is a block diagram illustrating an example video coding system 10 that may utilize the techniques of this disclosure for palette-based video coding. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by the HEVC standard. However, it should be understood that the techniques of this disclosure may be used with any video coding techniques and/or standards that use a palette-based coding mode.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure for palette-based video coding are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely one example. The techniques of this disclosure may apply to video coding use cases (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium. Thus, while video decoder 30 may be referred to as "receiving" certain information, the receiving of information does not necessarily occur in real- or near-real-time and may be retrieved from a medium at some time after storage.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

In some examples, video encoder 20 and video decoder 30 operate according to a video compression standard, such as HEVC standard mentioned above. In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard. In some examples, the techniques described in this disclosure for palette-based coding may be applied to encoders and decoders configured to operation according to other video coding standards. Accordingly, application of a palette-based coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (e.g., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, in HEVC, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan. A coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units or blocks may include CTUs, CUs, PUs, transform units (TUs), macroblocks, macroblock partitions, and so on. In some contexts, discussion of PUs may be interchanged with discussion of macroblocks or macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (e.g., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive blocks (e.g., predictive luma, Cb and Cr blocks) for one or more PUs of a CU, video encoder 20 may generate residual blocks for the CU. Each sample in a residual block of the CU may indicate a difference between a sample in a predictive block of a PU of the CU and a corresponding sample in a coding block of the CU. For example, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., luma, Cb and Cr residual blocks) of a CU into one or more transform blocks (e.g., luma, Cb and Cr transform blocks). A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a transform block to generate a coefficient block for a TU. A coefficient block may be a two-dimensional array of transform coefficients. A transform coefficient may be a scalar quantity. For example, video encoder 20 may apply one or more transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream. The bitstream may also include syntax elements that are not entropy encoded.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI), and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may obtain syntax elements from the bitstream. For example, video decoder 30 may parse the bitstream to decode syntax elements from the bitstream. Video decoder 30 may reconstruct the pictures of the video data based at least in part on the syntax elements obtained (e.g., decoded) from the bitstream. The process to reconstruct the video data may be generally reciprocal to the process performed by video encoder 20. For instance, video decoder 30 may use MVs of PUs to determine inter-predictive sample blocks (e.g., inter-predictive blocks) for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors or pixel values representing the video data of a particular area (e.g., a given block). In this way, rather than coding actual pixel values or their residuals for a current block of video data, the video coder may code index values for one or more of the pixel values of the current block, where the index values indicate entries in the palette that are used to represent the pixel values of the current block (e.g., the index may map to a set of Y, Cr, and Cb values or to a set of R, G, and B values).

For example, video encoder 20 may encode a block of video data by determining a palette for the block, locating an entry in the palette having a value representative of the value of one or more individual pixels of the block, and encoding the block with index values that indicate the entry in the palette used to represent the one or more individual pixel values of the block. Additionally, video encoder 20 may signal the index values in an encoded bitstream. In turn, a video decoding device (e.g., video decoder 30) may obtain, from the encoded bitstream, the palette for a block, as well as index values used for determining the various individual pixels of the block using the palette. Video decoder 30 may match the index values of the individual pixels to entries of the palette to reconstruct the pixel values of the block. In instances where a pixel value of an individual pixel is not close enough to any of the pixel values represented by the corresponding palette for the block, video decoder 30 may identify such an individual pixel as an escape pixel, for the purposes of palette-based coding. The pixel value of an escape pixel may be encoded explicitly rather than by way of a palette index.

In another example, video encoder 20 may encode a block of video data according to the following operations. Video encoder 20 may determine prediction residual values for individual pixels of the block, determine a palette for the block, and locate an entry (e.g., index value) in the palette having a value representative of the value of one or more of the prediction residual values of the individual pixels. Additionally, video encoder 20 may encode the block with index values that indicate the entry in the palette used to represent the corresponding prediction residual value for each individual pixel of the block. Video decoder 30 may obtain, from an encoded bitstream signaled by source device 12, a palette for a block, as well as index values for the prediction residual values corresponding to the individual pixels of the block. As described, the index values may correspond to entries in the palette associated with the current block. In turn, video decoder 30 may relate the index values of the prediction residual values to entries of the palette to reconstruct the prediction residual values of the block. The prediction residual values may be added to the prediction values (for example, obtained using intra or inter prediction) to reconstruct the pixel values of the block.

As described in more detail below, the basic idea of palette-based coding is that, for a given block of video data to be coded, video encoder 20 may derive a palette that includes the most dominant pixel values in the current block. For instance, the palette may refer to a number of pixel values which are determined or assumed to be dominant and/or representative for the current CU. Video encoder 20 may first transmit the size and the elements of the palette to video decoder 30. Additionally, video encoder 20 may encode the pixel values in the given block according to a certain scanning order. For each pixel included in the given block, video encoder 20 may signal the index value that maps the pixel value to a corresponding entry in the palette. If the pixel value is not close enough to the value of any of the palette entries (e.g., close enough in value compared some predetermined threshold), then such a pixel is defined as an "escape pixel." In accordance with palette-based coding, video encoder 20 may encode and signal an index value that is reserved for an escape pixel, i.e., to indicate that it is an escape pixel and not a pixel for which there is an entry in the palette. In some examples, video encoder 20 may also encode and signal the pixel value or a residual value (or quantized versions thereof) for an escape pixel included in the given block.

Upon receiving the encoded video bitstream signaled by video encoder 20, video decoder 30 may first determine the palette based on the information received from video encoder 20. Video decoder 30 may then map the received index values associated with the pixel locations in the given block to entries of the palette to reconstruct the pixel values of the given block. In some instances, video decoder 30 may determine that a pixel of a palette-coded block is an escape pixel, such as by determining that the pixel is palette-coded with an index value reserved for escape pixels. In instances where video decoder 30 identifies an escape pixel in a palette-coded block, video decoder 30 may receive the pixel value or a residual value (or quantized versions thereof) for an escape pixel included in the given block. Video decoder 30 may reconstruct the palette-coded block by mapping the individual pixel values to the corresponding palette entries, and by using the pixel value or residual value (or quantized versions thereof) to reconstruct any escape pixels included in the palette-coded block.

Video encoder 20 and/or video decoder 30 may be configured to operate according to the techniques described in this disclosure, as will be described in more detail below. In general, video encoder 20 and/or video decoder 30 may be configured to encode and decode video data using one or more palette coding modes, wherein the palette coding modes do not include a palette sharing mode. Techniques of this disclosure include a video coding device, such as video encoder 20, being configured to determine a first bin of a first syntax element that indicates a number of entries in a current palette that are explicitly signaled. Video encoder 20 may be further configured to encode a bitstream. The bitstream may include the first syntax element. The bitstream also may not include a second syntax element that indicates a palette sharing mode. In some examples, determining the first bin of the first syntax element comprises determining the first bin of the first syntax element using a context-adaptive binary arithmetic coding. In other examples, determining the first bin of the first syntax element comprises determining the first bin of the first syntax element using one or more contexts. In some examples of using one or more contexts, the one or more contexts may be based on at least one of a predicted number of palate coding entries or a block size.

Further, this disclosure describes video encoder 20 being configured to determine that a current pixel is a first pixel in a line in a scanning order. Video encoder 20 may further determine that a neighboring pixel situated above the current pixel is available. In response to determining that the current pixel is the first pixel in the line in the scanning order and determining that the neighboring pixel situated above the current pixel is available, video encoder 20 may be further configured to bypass encoding a first syntax element in a bitstream, wherein the first syntax element indicates a run type and encode a remainder of the bitstream.

Further, techniques of this disclosure include video encoder 20 being configured to determine a first syntax element that indicates a maximum allowed palette size and has a minimum value of zero. Video encoder 20 may also be configured to encode a bitstream that includes the first syntax element. In some examples, the bitstream further includes a second syntax element that indicates a maximum predictor palette size and has a minimum value of zero. In some examples, the first syntax element has a maximum value of 4096 and the second syntax element has a maximum value of 8192. In other examples, the first syntax element has a maximum value of 4095 and the second syntax element has a maximum value of 4095. In other examples, the first syntax element has a maximum value of 4095 and the second syntax element has a maximum value of 8191. In still other examples, the first syntax element has a maximum value that is equal to a number of pixels in a largest coding unit and the second syntax element has a maximum value that is equal to a positive constant, such as 2, multiplied by the maximum value of the first syntax element. In other examples, the bitstream includes another syntax element that indicates a number of entries in a current palette that are explicitly signaled. In some examples of this, this syntax element is represented by one of a Golomb Rice code, an Exponential Golomb code, a Truncated Rice code, or a Unary code. In other examples of this, this syntax element is represented by one of a truncated Golomb Rice code, a truncated Exponential Golomb code, a truncated Truncated Rice code, a truncated Unary code, or a code that is also used to code a third syntax element included in the encoded bitstream that indicates whether a palette index is copied from a palette index in a row above a current pixel or is explicitly coded in the encoded bitstream. In some examples, this syntax element is represented by a Truncated Rice mode. In some examples, the syntax element that indicates a number of entries in a current palette that are explicitly signaled has a maximum value that is equal to the number of pixels in a current block of the video data.

Further, this disclosure describes a video coding device, such as video decoder 30, being configured to receive an encoded bitstream. The encoded bitstream does not include a first syntax element that indicates a palette sharing mode. Further, the encoded bitstream includes a second syntax element that indicates a number of entries in a current palette that are explicitly signaled. Video decoder 30 may be further configured to decode a first bin of the second syntax element. In some examples, decoding the first bin of the second syntax element comprises decoding the first bin of the second syntax element using a context-adaptive binary arithmetic coding element. In other examples, decoding the first bin of the second syntax element comprises decoding the first bin of the second syntax element using one or more contexts. In some examples of using one or more contexts, the one or more contexts may be based on at least one of a predicted number of palate coding entries or a block size.

Further, techniques of this disclosure include video decoder 30 being configured to receive an encoded bitstream. The encoded bitstream may include a first syntax element that indicates a run type. Video decoder 30 may further be configured to determine that a current pixel is a first pixel in a line in a scanning order. Video decoder 30 may further determine that a neighboring pixel situated above the current pixel is available. In response to determining that a current pixel is a first pixel in a line in a scanning order and determining that a neighboring pixel situated above the current pixel is available, video decoder 30 may bypass decoding the first syntax element.

Further, techniques of this disclosure include video decoder 30 being configured to receive an encoded bitstream that includes a first syntax element that indicates a maximum allowed palette size and has a minimum value of zero. Video decoder 30 may be further configured to decode the encoded bitstream. In some examples, the encoded bitstream further includes a second syntax element that indicates a maximum predictor palette size and has a minimum value of zero. In some examples, the first syntax element has a maximum value of 4096 and the second syntax element has a maximum value of 8192. In other examples, the first syntax element has a maximum value of 4095 and the second syntax element has a maximum value of 4095. In other examples, the first syntax element has a maximum value of 4095 and the second syntax element has a maximum value of 8191. In still other examples, the first syntax element has a maximum value that is equal to a number of pixels in a largest coding unit and the second syntax element has a maximum value that is equal to a positive constant, such as 2, multiplied by the maximum value of the first syntax element. In other examples, the encoded bitstream includes another syntax element that indicates a number of entries in a current palette that are explicitly signaled. In some examples, the syntax element that indicates a number of entries in a current palette that are explicitly signaled is represented by one of a Golomb Rice code, an Exponential Golomb code, a Truncated Rice code, or a Unary code. In other examples, the syntax element that indicates a number of entries in a current palette that are explicitly signaled is represented by one of a truncated Golomb Rice code, a truncated Exponential Golomb code, a truncated Truncated Rice code, a truncated Unary code, or the same code that is used to code a syntax element that indicates whether a palette index is copied from a palette index in a row above a current pixel or is explicitly coded in the encoded bitstream. In some examples, the syntax element that indicates a number of entries in a current palette that are explicitly signaled is represented by a Truncated Rice mode. In some examples, the syntax element that indicates a number of entries in a current palette that are explicitly signaled has a maximum value that is equal to the number of pixels in a current block of the video data.

In another example of the disclosure, video decoder 30 may be configured to receive a block of video data in an encoded video bitstream, the block of video data having been encoded using a palette-based coding mode, receive a plurality of syntax elements that are indicative of a palette that was used to encode the block of video data, the plurality of syntax elements including a first syntax element that indicates a number of a palette values for the palette that are explicitly signaled in the encoded video bitstream, decode the plurality of syntax elements, including decoding the first syntax element using one or more Golomb codes, reconstruct the palette based on the decoded plurality of syntax elements, and decode the block of video data using the reconstructed palette.

In another example of the disclosure, video encoder 20 may be configured to encode a block of video data using a palette-based coding mode and a palette, generate a plurality of syntax elements that are indicative of the palette that was used to encode the block of video data, the plurality of syntax elements including a first syntax element that indicates a number of a palette values for the palette that are explicitly signaled in the encoded video bitstream, encode the first syntax element using one or more Golomb codes, and include the plurality of syntax elements in an encoded video bitstream.

Figure 2:
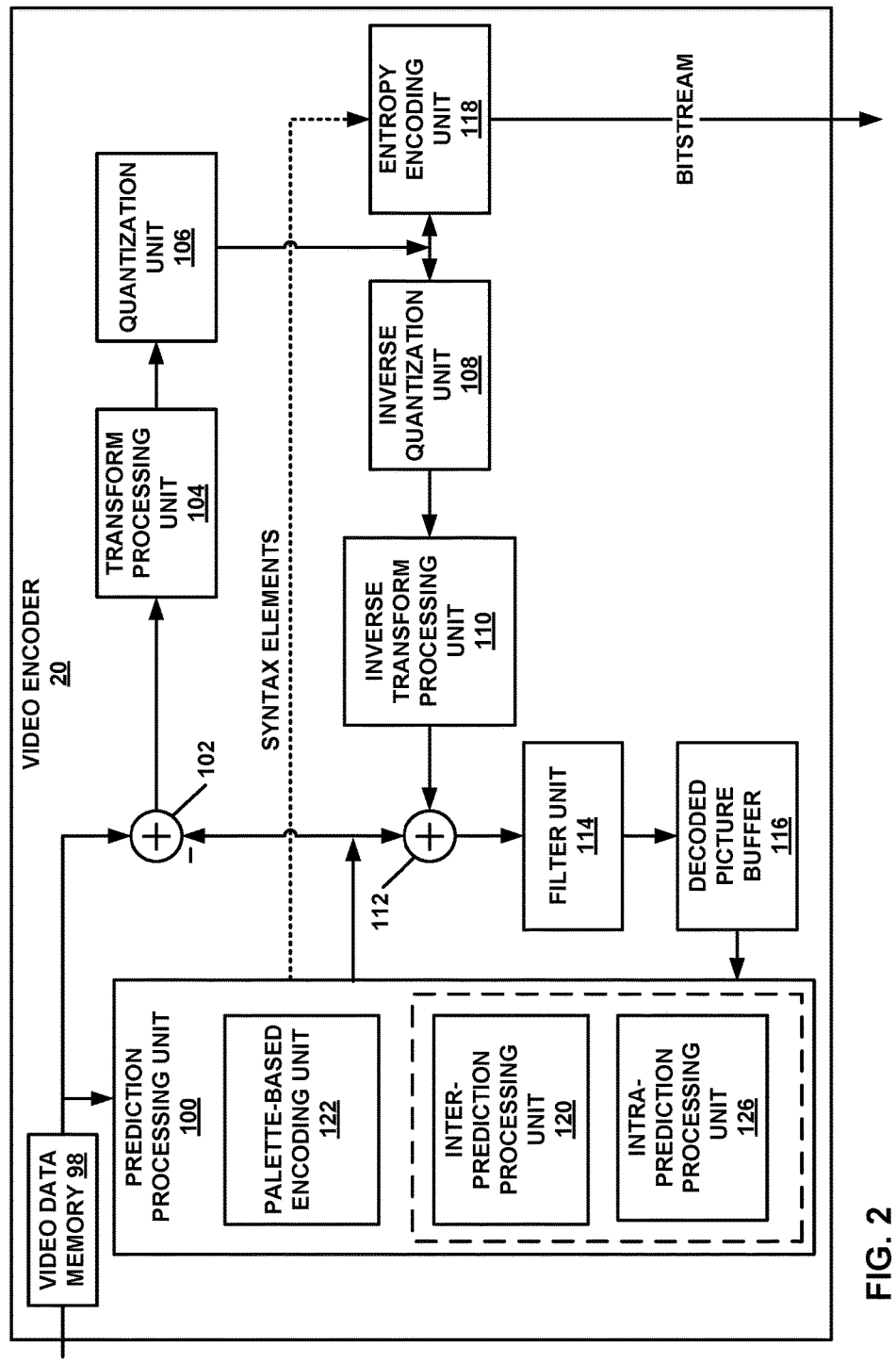
FIG. 2 is a block diagram illustrating an example video encoder that may implement the techniques described in this disclosure.

FIG. 2 is a block diagram illustrating an example video encoder 20 that may implement various techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a video data memory 98, a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different structural components.

Video data memory 98 may store video data to be encoded by the components of video encoder 20. The video data stored in video data memory 98 may be obtained, for example, from video source 18 of FIG. 1. Decoded picture buffer 116 may be a reference picture memory that stores reference video data for use in encoding video data by video encoder 20, e.g., in intra- or inter-coding modes. Video data memory 98 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 98 and decoded picture buffer 116 may be provided by the same memory device or separate memory devices. In various examples, video data memory 98 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (e.g., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include one or more predictive sample blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predictive block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely correspond to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the motion vector (MV) as the motion information of the PU. The motion compensation unit of inter-prediction processing unit 120 may generate the predictive sample blocks of the PU based on actual or interpolated samples at the reference location indicated by the MV of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. The motion compensation unit of inter-prediction processing unit 120 may generate the predictive sample blocks of the PU based at least in part on actual (i.e., integer precision) or interpolated (i.e., fractional precision) samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive sample blocks of the PU based at least in part on actual or interpolated samples at the reference region indicated by the motion vector of the PU.

In accordance with various examples of this disclosure, video encoder 20 may be configured to perform palette-based coding. With respect to the HEVC framework, as an example, the palette-based coding techniques may be configured to be used as a CU mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to a PU mode. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based coding when a palette-based encoding mode is selected, e.g., for a CU or PU. For example, palette-based encoding unit 122 may be configured to generate a palette having entries indicating pixel values, select pixel values in a palette to represent pixel values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

Palette-based encoding unit 122 may be configured to generate any of the various syntax elements described herein related to palette-based coding. Accordingly, video encoder 20 may be configured to encode blocks of video data using palette-based code modes as described in this disclosure. Video encoder 20 may selectively encode a block of video data using a palette coding mode, or encode a block of video data using a different mode, e.g., such an HEVC inter-predictive or intra-predictive coding mode. The block of video data may be, for example, a CU or PU generated according to an HEVC coding process. A video encoder 20 may encode some blocks with inter-predictive temporal prediction or intra-predictive spatial coding modes and decode other blocks with the palette-based coding mode.

Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. When using some intra prediction modes to generate a set of predictive data for the PU, intra-prediction processing unit 126 may extend values of samples from sample blocks of neighboring PUs across the predictive blocks of the PU in directions associated with the intra prediction modes. The neighboring PUs may be above, above and to the right, above and to the left, or to the left of the PU, assuming a left-to-right, top-to-bottom encoding order for PUs, CUs, and CTUs. Intra-prediction processing unit 126 may use any of a number of different intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the coding blocks (e.g., luma, Cb and Cr coding blocks) of a CU and the selected predictive sample blocks (e.g., predictive luma, Cb and Cr blocks) of the PUs of the CU, residual blocks (e.g., luma, Cb and Cr residual blocks) of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, in some examples, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In some examples, residual coding is not performed with palette coding. Accordingly, video encoder 20 may not perform transformation or quantization when coding using a palette coding mode. In addition, video encoder 20 may entropy encode data generated using a palette coding mode separately from residual data.

According to one or more of the techniques of this disclosure, video encoder 20, and specifically palette-based encoding unit 122, may perform palette-based video coding of predicted video blocks. As described above, a palette generated by video encoder 20 may be explicitly encoded and sent to video decoder 30, predicted from previous palette entries, predicted from previous pixel values, or a combination thereof.

In accordance with one or more techniques of this disclosure, palette-based encoding unit 122 may apply techniques of this disclosure to perform sample value to index conversion to encode video data using one or more palette coding modes, wherein the palette coding modes do not include a palette sharing mode. Techniques of this disclosure include palette-based encoding unit 122 of video encoder 20, being configured to determine a first bin of a first syntax element that indicates a number of entries in a current palette that are explicitly signaled. Palette-based encoding unit 122 of video encoder 20 may be further configured to encode a bitstream. The bitstream may include the first syntax element. The bitstream also may not include a second syntax element that indicates a palette sharing mode. In some examples, determining the first bin of the first syntax element comprises determining the first bin of the first syntax element using a context-adaptive binary arithmetic coding. In other examples, determining the first bin of the first syntax element comprises determining the first bin of the first syntax element using one or more contexts. In some examples of using one or more contexts, the one or more contexts may be based on at least one of a predicted number of palette coding entries or a block size.

Further, techniques of this disclosure include palette-based encoding unit 122 of video encoder 20 being configured to determine that a current pixel is a first pixel in a line in a scanning order. Palette-based encoding unit 122 of video encoder 20 may further determine that a neighboring pixel situated above the current pixel is available. In response to determining that the current pixel is the first pixel in the line in the scanning order and determining that the neighboring pixel situated above the current pixel is available, palette-based encoding unit 122 of video encoder 20 may be further configured to bypass encoding a first syntax element in a bitstream, wherein the first syntax element indicates a run type, and encode a remainder of the bitstream.

Further, techniques of this disclosure include palette-based encoding unit 122 of video encoder 20 being configured to determine a first syntax element that indicates a maximum allowed palette size and has a minimum value of zero. Palette-based encoding unit 122 of video encoder 20 may also be configured to encode a bitstream that includes the first syntax element. In some examples, the bitstream further includes a second syntax element that indicates a maximum predictor palette size and has a minimum value of zero. In some examples, the first syntax element has a maximum value of 4096 and the second syntax element has a maximum value of 8192. In other examples, the first syntax element has a maximum value of 4095 and the second syntax element has a maximum value of 4095. In other examples, the first syntax element has a maximum value of 4095 and the second syntax element has a maximum value of 8191. In still other examples, the first syntax element has a maximum value that is equal to a number of pixels in a largest coding unit and the second syntax element has a maximum value that is equal to a positive constant, such as 2, multiplied by the maximum value of the first syntax element. In other examples, the bitstream includes another syntax element that indicates a number of entries in a current palette that are explicitly signaled. In some examples of this, this syntax element is represented by one of a Golomb Rice code, an Exponential Golomb code, a Truncated Rice code, or a Unary code. In other examples of this, this syntax element is represented by one of a truncated Golomb Rice code, a truncated Exponential Golomb code, a truncated Truncated Rice code, a truncated Unary code, or a code that is also used to code a third syntax element included in the encoded bitstream that indicates whether a palette index is copied from a palette index in a row above a current pixel or is explicitly coded in the encoded bitstream. In some examples, this syntax element is represented by a Truncated Rice mode. In some examples, the syntax element that indicates a number of entries in a current palette that are explicitly signaled has a maximum value that is equal to the number of pixels in a current block of the video data.

Figure 3:
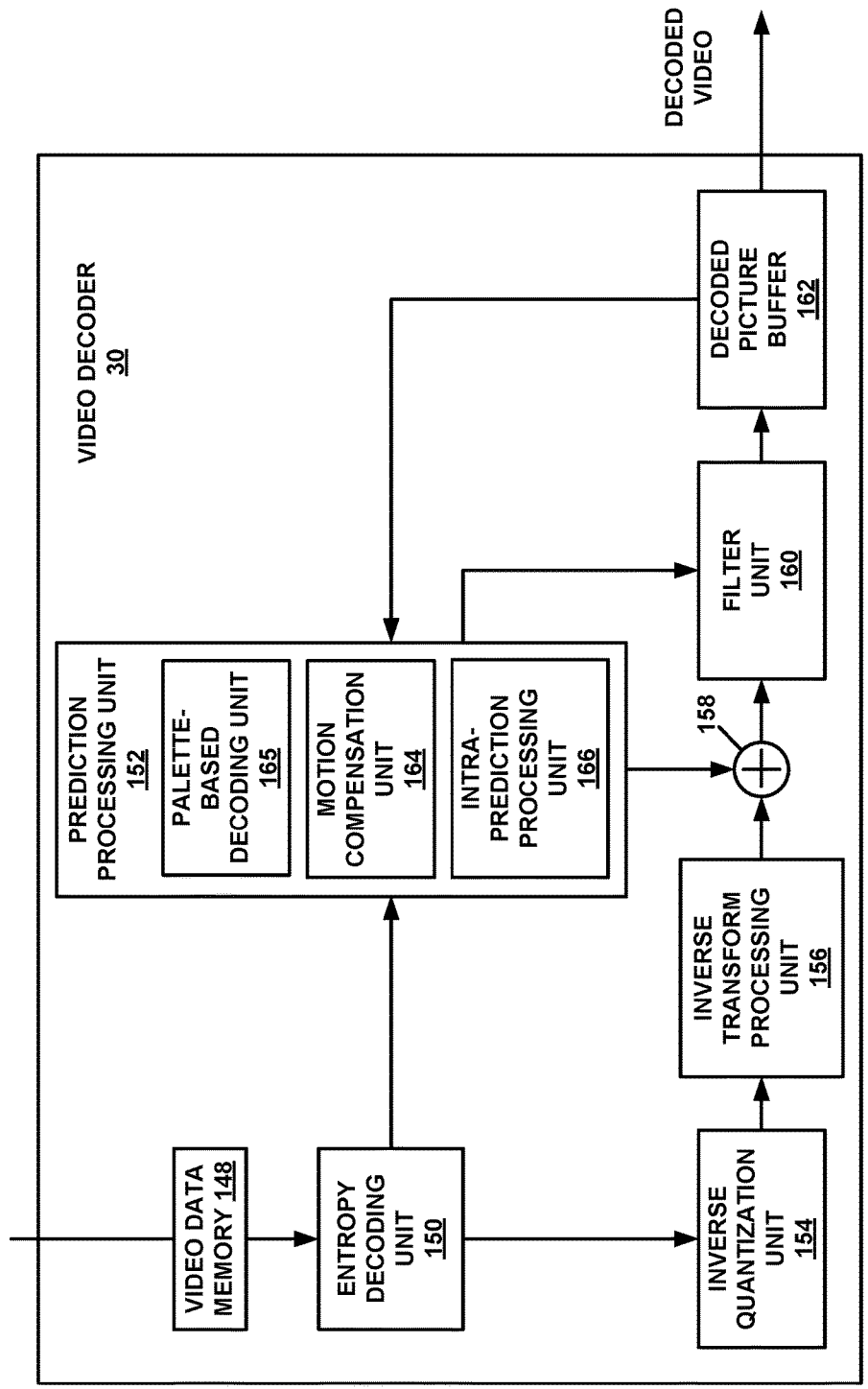
FIG. 3 is a block diagram illustrating an example video decoder that may implement the techniques described in this disclosure.

FIG. 3 is a block diagram illustrating an example video decoder 30 that is configured to implement the techniques of this disclosure. Video decoder 30 may operate in a reciprocal manner to that of video encoder 20 described with reference to FIG. 2. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods where palette mode coding is used.

In the example of FIG. 3, video decoder 30 includes a video data memory 148, an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different structural components.

Video data memory 148 may store video data, such as an encoded video bitstream, to be decoded by the components of video decoder 30. The video data stored in video data memory 148 may be obtained, for example, from channel 16, e.g., from a local video source, such as a camera, via wired or wireless network communication of video data, or by accessing physical data storage media. Video data memory 148 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 148 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 148 and decoded picture buffer 162 may be provided by the same memory device or separate memory devices. In various examples, video data memory 148 may be on-chip with other components of video decoder 30, or off-chip relative to those components.

Video data memory 148, e.g., a CPB, may receive and store encoded video data (e.g., NAL units) of a bitstream. Entropy decoding unit 150 may receive encoded video data (e.g., NAL units) from video data memory 148 and may parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained (e.g., extracted) from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, e.g., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, e.g., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra-prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive blocks (e.g., predictive luma, Cb and Cr blocks) for the PU.

Reconstruction unit 158 may use the transform blocks (e.g., luma, Cb and Cr transform blocks) associated with TUs of a CU and the predictive blocks (e.g., luma, Cb and Cr blocks) of the PUs of the CU, e.g., either intra-prediction data or inter-prediction data, as applicable, to reconstruct the coding blocks (e.g., luma, Cb and Cr coding blocks) of the CU. For example, reconstruction unit 158 may add samples of the transform blocks (e.g., luma, Cb and Cr transform blocks) to corresponding samples of the predictive blocks (e.g., predictive luma, Cb and Cr blocks) to reconstruct the coding blocks (e.g., luma, Cb and Cr coding blocks) of the CU.

Filter unit 160 may perform a deblocking operation to reduce blocking artifacts associated with the coding blocks (e.g., luma, Cb and Cr coding blocks) of the CU. Video decoder 30 may store the coding blocks (e.g., luma, Cb and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb and Cr blocks) in decoded picture buffer 162, intra prediction or inter prediction operations on PUs of other CUs. In this way, video decoder 30 may extract, from the bitstream, transform coefficient levels of a significant coefficient block, inverse quantize the transform coefficient levels, apply a transform to the transform coefficient levels to generate a transform block, generate, based at least in part on the transform block, a coding block, and output the coding block for display.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values. Furthermore, in this example, palette-based decoding unit 165 may receive information associating at least some positions of a block of video data with entries in the palette. In this example, palette-based decoding unit 165 may select pixel values in the palette based on the information. Additionally, in this example, palette-based decoding unit 165 may reconstruct pixel values of the block based on the selected pixel values. Although various functions are described as being performed by palette-based decoding unit 165, some or all of such functions may be performed by other processing units, or a combination of different processing units.

In accordance with one or more techniques of this disclosure, palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, palette-based decoding unit 165 decodes the block of video data using a non-palette based coding mode, e.g., such an HEVC inter-predictive or intra-predictive coding mode, when the palette coding mode information indicates that the palette coding mode does not apply to the block. The block of video data may be, for example, a CU or PU generated according to an HEVC coding process. A video decoder 30 may decode some blocks with inter-predictive temporal prediction or intra-predictive spatial coding modes and decode other blocks with the palette-based coding mode. The palette-based coding mode may comprise one of a plurality of different palette-based coding modes, or there may be a single palette-based coding mode.

According to one or more of the techniques of this disclosure, video decoder 30, and specifically palette-based decoding unit 165, may perform palette-based video decoding of palette-coded video blocks. As described above, a palette decoded by video decoder 30 may be explicitly encoded and signaled by video encoder 20, reconstructed by video decoder 30 with respect to a received palette-coded block, predicted from previous palette entries, predicted from previous pixel values, or a combination thereof.

Palette-based decoding unit 165 may apply techniques of this disclosure to perform sample value to index conversion decode video data using one or more palette coding modes, wherein the palette coding modes do not include a palette sharing mode. Further, techniques of this disclosure include palette-based decoding unit 165 of video decoder 30 being configured to receive an encoded bitstream. In this example, the encoded bitstream does not include a first syntax element that indicates a palette sharing mode. Further, the encoded bitstream includes a second syntax element that indicates a number of entries in a current palette that are explicitly signaled. Palette-based decoding unit 165 of video decoder 30 may be further configured to decode a first bin of the second syntax element. In some examples, decoding the first bin of the second syntax element comprises decoding the first bin of the second syntax element using a context-adaptive binary arithmetic coding (CABAC) unit. In other examples, decoding the first bin of the second syntax element comprises decoding the first bin of the second syntax element using one or more contexts. In some examples of using one or more contexts, the one or more contexts may be based on at least one of a predicted number of palate coding entries or a block size.

Further, techniques of this disclosure include palette-based decoding unit 165 of video decoder 30 being configured to receive an encoded bitstream. The encoded bitstream may include a first syntax element that indicates a run type. Palette-based decoding unit 165 of video decoder 30 may further be configured to determine that a current pixel is a first pixel in a line in a scanning order. Palette-based decoding unit 165 of video decoder 30 may further determine that a neighboring pixel situated above the current pixel is available. In response to determining that a current pixel is a first pixel in a line in a scanning order and determining that a neighboring pixel situated above the current pixel is available, palette-based decoding unit 165 of video decoder 30 may bypass decoding the first syntax element.

Further, techniques of this disclosure include palette-based decoding unit 165 of video decoder 30 being configured to receive an encoded bitstream that includes a first syntax element that indicates a maximum allowed palette size and has a minimum value of zero. Palette-based decoding unit 165 of video decoder 30 may be further configured to decode the encoded bitstream. In some examples, the encoded bitstream further includes a second syntax element that indicates a maximum predictor palette size and has a minimum value of zero. In some examples, the first syntax element has a maximum value of 4096 and the second syntax element has a maximum value of 8192. In other examples, the first syntax element has a maximum value of 4095 and the second syntax element has a maximum value of 4095. In other examples, the first syntax element has a maximum value of 4095 and the second syntax element has a maximum value of 8191. In still other examples, the first syntax element has a maximum value that is equal to a number of pixels in a largest coding unit and the second syntax element has a maximum value that is equal to a positive constant, such as 2, multiplied by the maximum value of the first syntax element. In other examples, the encoded bitstream includes another syntax element, e.g., a third syntax element that indicates a number of entries in a current palette that are explicitly signaled. In some examples of this disclosure, the syntax element that indicates a number of entries in a current palette that are explicitly signaled is represented by one of a Golomb Rice code, an Exponential Golomb code, a Truncated Rice code, or a Unary code. In other examples of this disclosure, the syntax element that indicates a number of entries in a current palette that are explicitly signaled is represented by one of a truncated Golomb Rice code, a truncated Exponential Golomb code, a truncated Truncated Rice code, a truncated Unary code, or a code that is also used to code a third syntax element included in the encoded bitstream that indicates whether a palette index is copied from a palette index in a row above a current pixel or is explicitly coded in the encoded bitstream. In some examples, the syntax element that indicates a number of entries in a current palette that are explicitly signaled is represented by a Truncated Rice mode. In some examples, the syntax element that indicates a number of entries in a current palette that are explicitly signaled has a maximum value that is equal to the number of pixels in a current block of the video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

In some examples, the palette-based coding techniques may be configured for use in one or more coding modes of the HEVC standard or the HEVC SCC standard. In other examples, the palette-based coding techniques can be used independently or as part of other existing or future systems or standards. In some examples, the techniques for palette-based coding of video data may be used with one or more other coding techniques, such as techniques for inter-predictive coding or intra-predictive coding of video data. For example, as described in greater detail below, an encoder or decoder, or combined encoder-decoder (codec), may be configured to perform inter- and intra-predictive coding, as well as palette-based coding.

With respect to the HEVC framework, as an example, the palette-based coding techniques may be configured to be used as a coding unit (CU) mode. In other examples, the palette-based coding techniques may be configured to be used as a prediction unit (PU) mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

The basic idea of palette-based coding is that, for each CU, a palette is derived which comprises (and may consist of) the most dominant pixel values in the current CU. The size and the elements of the palette are first transmitted from a video encoder to a video decoder. The size and/or the elements of the palette can be directly coded or predictively coded using the size and/or the elements of the palette in the neighboring CUs (e.g. above and/or left coded CU). After that, the pixel values in the CU are encoded based on the palette according to a certain scanning order. For each pixel location in the CU, a flag, e.g., palette_flag, is first transmitted to indicate whether the pixel value is included in the palette. In some examples, such a flag is called a copy_above_palette_indices_flag. For those pixel values that map to an entry in the palette, the palette index associated with that entry is signaled for the given pixel location in the CU. For those pixel values that do not exist in the palette, a special index may be assigned to the pixel and the actual pixel value (in some cases, a quantized pixel value) is transmitted for the given pixel location in the CU. These pixels are referred to as "escape pixels." An escape pixel can be coded using any existing entropy coding method such as fixed length coding, unary coding, etc.

In other examples, no flag is used to explicitly indicate whether a pixel is an "escape" pixel. Instead, a flag or other syntax element may be used to indicate a run type. The syntax element indicating the run type may indicate whether the following indices are copied from the position above the current pixel or if there is a run of signaled index values. If the derived index value of a particular pixel corresponds to an "escape index" (e.g., a predetermined index in the palette indicating the use of an escape pixel), then video decoder 30 may determine that such a pixel is an escape pixel.

To improve screen content coding efficiency, several methods have been proposed that extend palette mode. For example, such methods may be found in JCTVC-S0114 (Kim, J., et al., "CE6-related: Enabling copy above mode prediction at the boundary of CU," Joint Collaborative Team on Video Coding (JCT-VC) of ITU-T SG 16 WP 3 and ISO/IEC JTC 1/SC 29/WG 11, 19$^{th}$ Meeting: Strasbourg, FR, 17-24 Oct. 2014); JCTVC-50120 (Ye, J., et al., "Non-CE6: Copy previous mode," Joint Collaborative Team on Video Coding (JCT-VC) of ITU-T SG 16 WP 3 and ISO/IEC JTC 1/SC 29/WG 11, 19$^{th}$ Meeting: Strasbourg, FR, 17-24 Oct. 2014); and JCTVC-S0151 (Wang, W., et al., "Non-CE6: 2-D Index Map Coding of Palette Mode in HEVC SCC" Joint Collaborative Team on Video Coding (JCT-VC) of ITU-T SG 16 WP 3 and ISO/IEC JTC 1/SC 29/WG 11, 19$^{th}$ Meeting: Strasbourg, FR, 17-24 Oct. 2014).

The document X. Guo and A. Saxena, "RCE4: Summary report of HEVC Range Extension Core Experiments 4 (RCE4) on palette coding for screen content," JCTVC-P0035, San Jose, US, 9-17 Jan. 2014 describes two test results of palette-based modes, which were reported to achieve significant Bjontegaard Distortion-rate (BD-rate) reduction, especially for screen contents. The two methods are briefly summarized below.

In one example method, as described, for example, in the document X. Guo, Y. Lu, and S. Li, "RCE4: Test 1. Major-color-based screen content coding," JCTVC-P0108, San Jose, US, 9-17 Jan. 2014, a histogram-based algorithm is used to classify the pixels. In particular, the most significant N peak values in a histogram are selected as major colors for coding. The pixel values that are close to a major color will be quantized to the major color. Other pixels that do not belong to any major color sets are escape pixels, which are also quantized before coding. For lossless coding, no quantization is used.

By using classification, pixels of a coding unit (CU) can be converted into color indices. After that, the major color number and values are coded. Then, the color indices are coded as follows:

For each pixel line, a flag is signalled to indicate the coding mode. There are three modes: horizontal mode, vertical mode and normal mode.

If the mode is horizontal mode, the whole line (i.e., all of the pixels in the entire line) shares the same color index. In this case, the color index is transmitted, If the mode is vertical mode, the whole line is the same with the above line, in this case, nothing is transmitted. The current line copies the color indices of the above line.

If the mode is normal mode, a flag is signalled for each pixel position to indicate whether it is the same with one of the left and above pixels. If not, the index itself is transmitted.

In addition, if the pixel is escape pixel, the pixel value is transmitted.

In another example method, as described, for example, in the document L. Guo, W. Pu, M. Karczewicz, J. Sole, R. Joshi, and F. Zou, "RCE4: Results of Test 2 on Palette Mode for Screen Content Coding," JCTVC-P0198, San Jose, US, 9-17 Jan. 2014, a palette-based coding mode is included as a CU mode. The encoding process of the second method may include the following:

Transmission of the palette: an entry-wise prediction scheme is used to encode the current palette based on the palette of the left CU (the CU neighboring the CU currently being coded to the left). After that, non-predicted entries of the palette are transmitted.

Transmission of pixel values: the pixels in the CU are encoded in a raster scan order using the following three modes:

"Run mode": A palette index is first signaled, followed by "palette_run" (M). The following M palette indexes are the same as the signaled palette index first signaled.

"Copy above mode": A value "copy run" (N) is transmitted to indicate that for the following N palette indexes are the same as their above neighbors, respectively.

"Pixel mode": A prediction flag is first transmitted. The flag value being equal to 1 indicates prediction residual using the reconstructed top neighboring pixel as a predictor is transmitted. If the value of this flag is 0, the pixel value is transmitted without prediction.

The palette may make up a relatively significant portion of the bits for a palette coded block (e.g., CU). Accordingly, the video coder may predict one or more entries of the palette based on one or more entries of a previously coded palette (e.g., as noted above with respect to the "transmission of the palette").

In some examples, the video coder may generate a palette predictor list when predicting palette entries. For example, the document C. Gisquet, G. Laroche, and P. Onno, "AhG10: Palette predictor stuffing," JCTVC-Q0063 discloses one example process for determining palette predictors. In some examples, the video coder may use a Boolean vector to indicate whether each item in a palette predictor list is used (or not used) for predicting one or more entries in the palette for the block currently being coded.

In some examples, all of the items in the palette predictor list are derived from the previously-coded palette (e.g., the palette coded with the previously coded block). However, such palettes may be spatially far away from the current CU, which may make the palette correlation relatively weak. In general, expanding the palette predictor table may be helpful (e.g., may provide more accurate predictors, which may result in an efficiency gain). However, determining and using a relatively large palette predictor table results in a relatively longer Boolean vector.

In one example of palette coding, video encoder 20 may generate a syntax element, such as a flag "PLT_Mode_flag," that indicates whether or not a palette-based coding mode is used for a particular region of a video frame. For example, the PLT_Mode_flag may be generated at the slice level, the CU-level, the PU-level, or any other level of a video frame. For example, video encoder 20 may generate the PLT_Mode_flag at the CU level and signal the PLT_Mode_flag in an encoded video bitstream. Video decoder 30 may then parse the PLT_Mode_flag upon decoding the encoded video bitstream. In this example, a value of this PLT_Mode_flag equal to 1 specifies that the current CU is encoded using a palette mode. In this case, video decoder 30 may apply the palette-based coding mode to decode the CU. In some examples, a syntax element may indicate one of a plurality of different palette modes for the CU.

A value of this PLT_Mode_flag equal to 0 specifies that the current CU is encoded using a mode other than palette mode. For example, any of a variety of inter-predictive, intra-predictive, or other coding modes may be used. When a value of PLT_Mode_flag is 0, further information may be transmitted to signal which specific mode is used for encoding the respective CU, where such specific mode, typically, may be an HEVC coding mode (e.g., intra coding or inter coding). The use of the PLT_Mode_flag is described for purposes of example. In other examples, however, other syntax elements such as multi-bit codes may be used to indicate whether the palette-based coding mode is to be used for a CU (or PU in other examples) or to indicate which of a plurality of modes are to be used.

The PLT_Mode_flag or other syntax element may also be transmitted at a higher level. For example, the PLT_Mode_flag may be transmitted at slice level. In this case, a value of the flag equal to 1 implies that all of the CUs in the slice will be encoded using palette mode (which means no mode information, e.g., for palette mode or other modes, needs to be transmitted at CU level). Similarly, this flag can be signaled at the picture parameter set (PPS), sequence parameter set (SPS) or video parameter set (VPS) level. Also, a flag can be sent at one of these levels specifying whether the palette mode is enabled or disabled for the particular picture, slice, etc., while the PLT_Mode_flag indicates whether the palette-based coding mode is used for each CU. In this case, if a flag or other syntax element sent at the slice, PPS, SPS or VPS level indicates that palette coding mode is disabled, in some examples, there may be no need to signal the PLT_Mode_flag for each CU. Alternatively, if a flag or other syntax element sent at the slice, PPS, SPS or VPS level indicates that palette coding mode is enabled; the PLT_Mode_flag may be further signaled to indicate whether the palette-based coding mode is to be used for each CU. Again, as mentioned above, application of these techniques for indicating palette-based coding of a CU could additionally or alternatively be used to indicate palette-based coding of a PU.

A flag, such as PLT_Mode_flag, may also or alternatively be conditionally transmitted or inferred. The conditions for transmitting the PLT_Mode_flag or inferring the flag can be one or more of, as examples, the size of the CU, the frame type, the color space, the color component, the frame size, the frame rate, the layer id in scalable video coding or the view id in multi-view coding.

Techniques for the generation and transmission of a palette will now be discussed. Video encoder 20 may be configured to generate and signal one or more syntax elements and values that may be used by video decoder 30 to construct and/or reconstruct the palette used by video encoder 20 to encode a particular level of the video frame (e.g., a CU). In some examples, video encoder 20 may indicate or otherwise signal a palette for each CU. In other examples, video encoder 20 may indicate or otherwise signal a palette that may be shared among several CUs.

The size of the palette, e.g., in terms of the number of pixel values included, can be a fixed value or can be signaled by video encoder 20 in an encoded video bitstream. Video decoder 30 may receive and decode the indication of the palette size from the encoded video bitstream. The signaling can be separate for different components or a single size can be signaled for all the components. The different components may be, for example, luma and chroma components. The signaling can use unary codes or truncated unary codes (e.g., that truncates at a maximum limit of the palette size). Exponential-Golomb or Rice-Golomb codes can also be used. In some examples, the signaling of the size can be done in the following way: after signaling an entry in the palette, a "stop" flag is signaled. A value of this flag equal to 1 specifies that the current entry is the last one in the palette; a value of this flag equal to 0 specifies that there are more entries in the palette. The "stop" flag may not be transmitted by the encoder if the already constructed palette hits the maximum limit of the palette size. In some examples, the size of the palette can also be conditionally transmitted or inferred based on side information in the same way as described above for "Transmission of flag PLT_Mode_flag."

The palette can be transmitted separately for each color component in the CU. For example, there may be a palette for the Y component of this CU, another palette for the U component of this CU, and yet another palette for the V component of this CU. For the Y palette, the entry may (assumedly) be a representative Y value in this CU. The same applies to the U and V components. It is also possible that the palette may be transmitted for all of the color components in the CU. In this example, the i-th entry in the palette is a triple $(Y_i, U_i, V_i)$. In this case, the palette includes values for each of the components.

Prediction of a palette is an alternative approach to the "transmission of palette" described above. In some examples, palette prediction techniques may be used in conjunction with palette signaling techniques. That is, video encoder 20 may be configured to signal syntax elements that may be used by video decoder 30 to predict a portion of the total number of palette entries. In addition, video encoder 20 may be configured to explicitly signal another portion of the palette entries.

In one example of a palette prediction approach, for each CU, one flag "pred_palette_flag" is transmitted. A value of this flag equal to 1 specifies that the palette for the current CU will be predicted from past data and thus there is no need for the palette to be transmitted. A value of this flag equal to 0 means that the palette of the current CU needs to be transmitted. The flag can be separate for different color components (e.g., so that 3 flags need to be transmitted for a CU in YUV video), or a single flag can be signaled for all the color components. For example, a single flag may indicate whether the palettes are transmitted for all of the components or whether the palettes for all of the components will be predicted.

In some examples, the prediction can be performed in the following manner. If the prediction flag value is equal to 1, for the current CU, video encoder 20 copies the palette of one or more of the already encoded neighboring CUs. The palette of the already encoded neighboring CUs may have been transmitted or predicted. For example, the copied neighboring CU can be the left neighboring CU. In the case that the palette of the left CU is not available (as in the case in which the left CU is not encoded using the palette mode or the current CU is at the first column of the picture), the copy of the palette can be from the CU above the current CU. The copied palette can also be a combination of the palettes of a number of neighboring CUs. For example, one or more formulas, functions, rules or the like may be applied to generate a palette based on palettes of one or a combination of a plurality of neighboring CUs.

It is also possible that a candidate list may be constructed and an index is transmitted by video encoder 20 to indicate the candidate CU from which the current CU copies the palette. Video decoder 30 may construct the same candidate list and then use the index to select the palette of the corresponding CU for use with the current CU. For example, the candidate list may include one CU above and one CU on the left, relative to the current CU to be coded within a slice or picture. In this example, a flag or other syntax element may be signaled to indicate the candidate selection. For example, a transmitted flag equal to 0 means the copy is from the left CU, and a transmitted flag equal to 1 means the copy is from the top CU. Video decoder 30 selects the palette to be copied from the corresponding neighbor CU and copies it for use in decoding the current CU. The prediction can also be derived using the most frequent sample values in the causal neighbors of the current CU.

The prediction of palettes can also be entry-wise. For each entry in the palette, video encoder 20 generates and signals a flag. A value of a flag equal to 1 for a given entry specifies that a predicted value (for example, the corresponding entry from a selected candidate CU like the left CU) is used as the value of this entry. A value of a flag equal to 0 specifies that this entry is not predicted and its value will be transmitted to video decoder 30 from video encoder 20, e.g., signaled in a bitstream encoded by video encoder 20 for later decoding by video decoder 30.

The value of "pred_palette_flag," the candidate CU whose palette is used to predict the palette of the current CU or the rules for constructing the candidates, can be also conditionally transmitted or inferred based on side information in the same way as described above for "Transmission of flag PLT_Mode_flag."

Next, video encoder 20 may generate and signal a map which indicates what respective palette entry is associated with each pixel in a CU. The i-th entry in the map is corresponding to the i-th position in the CU. A value of the i-th entry equal to 1 specifies that the pixel value at this i-th location in the CU is one of the values in the palette, and a palette index is further transmitted so that video decoder 30 can reconstruct the pixel value (in case there is only one entry in the palette, the transmission of palette index may be skipped). A value of the i-th entry equal to 0 specifies that the pixel value at the i-th position in the CU is not in the palette and thus the pixel value will be transmitted to video decoder 30 explicitly.

If the pixel value at one position in the CU is a value in the palette, it is observed that there is a high probability that the neighboring positions in the CU have the same pixel value. So, after encoding a palette index (say j, which is corresponding to pixel value s) for a position, video encoder 20 may transmit a syntax element "run" to indicate the number of consecutive values of the same pixel value s in the CU before the scan reaches a different pixel value. For example, if the immediate next one has a value different than s, then run=0 is transmitted. If the next one is s but the one after is not s, then run=1.

In the case where a run is not transmitted (e.g., Implicit Run Derivation), the value of the run may be a constant, for example, 4, 8, 16, etc., or the value of the run may also be dependent on side information. For example, the value of the run may depend on block size, e.g., the run is equal to the width of the current block, or the height of the current block, or the half-width (or half-height) of the current block, or a fraction of the width and the height of the block, or a multiple of the height/width of the block. The value of the run may also be dependent on the QP, frame-type, color component, color format (e.g., 444, 422, 420) and/or color space (e.g., YUV, RGB). The value of the run may also depend on the scan direction. In other examples, the value of the run may depend on other types of side information. The value of the run may also be signaled using high level syntax (e.g., PPS, SPS).

In some examples, the map may not need to be transmitted. The run may only start at certain locations. For example, the run may only start at the beginning of each row, or the beginning of every N rows. The starting location may be different for different scan directions. For example, if the vertical scan is used, the run may start at the beginning of a column or the beginning of every N columns. The start location may depend on side information. For example, the start location may be the mid-point of each row, or each column, or 1/n, 2/n, . . . (n−1)/n (i.e., fractions) of each row/column. The start location may also depend on the QP, frame-type, color component, color format (e.g., 444, 422, 420) and/or color space (e.g., YUV, RGB). In other examples, the start position of the run may depend on other types of side information. The start position can also be signaled using high level syntax (e.g., PPS, SPS, etc.).

It is also possible that the implicit start position derivation and the implicit run derivation are combined. For example, the run is equal to the distance between two neighboring start positions. In the case that the start point is the beginning (i.e., the first position) of every row, the length of the run is a row.

The scan direction may be vertical or horizontal. It is possible that a flag is transmitted for each CU to indicate the scan direction. Flags may be transmitted separately for each component or a single flag may be transmitted and the indicated scan direction applies to all the color components. It is also possible that other scan directions, like 45 degree or 135 degree, are used. The scan order may be fixed or may be dependent on side information in the same way as described above for "Transmission of flag PLT_Mode_flag".

Above, it is explained how to transmit a palette. An alternative to the above-described examples is to construct the palette on-the-fly. In this case, at the beginning of the CU, there is no entry in the palette, and as video encoder 20 signals new values of the pixels for the positions in the CU, these values are included in the palette. That is, video encoder 20 adds pixel values to the palette as they are generated and transmitted for positions in the CU. Then, later positions in the CU that have the same values may refer to pixel values in the palette, e.g., with index values, instead of having video encoder 20 transmit the pixel values. Similarly, when video decoder 30 receives a new pixel value (e.g., signaled by the encoder) for a position in the CU, it includes the pixel value in the palette constructed by video decoder 30. When later positions in the CU have pixel values that have been added to the palette, video decoder 30 may receive information such as, e.g., index values, that identify the corresponding pixel values in the palette for reconstruction of the pixel values in the CU.

If the maximum palette size is reached, e.g., as the palette is constructed dynamically on-the-fly, then the encoder and decoder share the same mechanism to remove an entry of the palette. One method is to remove the oldest entry in the palette (FIFO queue). Another method is to remove the least used entry in the palette. Another is to weight both methods (time in palette and usage frequency) to decide the entry to be replaced. As one example, if a pixel value entry is removed from the palette, and the pixel value occurs again at a later position in the palette, the encoder may transmit the pixel value instead of including an entry in the palette. Additionally, or alternatively, it is possible that such a pixel value could be re-entered into the palette after having been removed, e.g., as the encoder and decoder scan the positions in the CU.

This disclosure also considers combining an initial palette signaling with the on-the-fly derivation of the palette. In one example, the initial palette would be updated with the coding of the pixels. For example, upon transmitting the initial palette, video encoder 20 may add values to the initial palette or change values in the initial palette as pixel values of additional locations in the CU are scanned. Likewise, upon receiving an initial palette, video decoder 30 may add values to the initial palette or change values in the initial palette as pixel values of additional locations in the CU are scanned. Similarly, the encoder can signal whether the current CU uses transmission of the entire palette, or on-the-fly palette generation, or a combination of transmission of an initial palette with updating of the initial palette by on-the-fly derivation. In some examples, the initial palette may be a full palette at maximum palette size, in which case values in the initial palette may be changed, or a reduced size palette, in which case values are added to the initial palette and, optionally values in the initial palette are changed.

Above, it was described how to transmit the map by identifying the pixel value. Along with that method described above, the transmission of the map can be done by signaling line copying. In one example, line copying is signaled by video encoder 20 such that the pixel value for an entry is equal to the pixel value of the entry of a line above (or in column on the left if the scan is vertical). Then, the 'run' of entries that are copied from the line may be signaled. Also, the line from which it is copied can be indicated; several lines above may be buffered for this purpose. For instance, the previous four rows are stored and which row is copied may be signaled with a truncated unary code or other codes, and then, how many entries of that row are copied, i.e., the run, may be signaled. Hence, in some examples, the pixel value for an entry may be signaled to be equal to a pixel value of an entry in a row immediately above or two or more rows above the current row.

In the case where no run is signaled, the value of the run may be constant/fixed or may be dependent on side information (and derived by the decoder) using the method described above.

It is also possible that the map does not need to be transmitted. For example, the run may start only at certain positions. The start position may be fixed or may be dependent on side information (and derived by the decoder), so the signaling of the start position may be skipped. Instead, one or more the techniques described above may be applied. The implicit start position derivation and the implicit run derivation may also be combined using the same method as described above.

If both methods of map transmission are used, then a flag or other syntax element may indicate whether the pixel is obtained from the palette or from the previous lines, and then an index indicates the entry in the palette or the row, and finally the 'run.'

This disclosure describes methods, devices, and techniques for simplifying palette mode coding and/or for improving palette-based coding efficiency. The techniques of this disclosure may be used in conjunction with one another or separately to improve coding efficiency and/or reduce codec complexity. In general, according to the techniques of this disclosure, a video coding device may be configured to encode and decode video data using one or more palette coding modes, wherein the palette coding modes do not include a palette sharing mode.

In one example palette mode, a flag, such as palette_share_flag, may be signaled into the bitstream to indicate that the palette for or more blocks of video data are shared or merged from the palette of another block of video data. The block of video data from which to obtain the shared palette may be based on predetermined rules (e.g., use the palette of the block to the left or above the current block) or may be otherwise indicated in the encoded video bitstream. As described in R. Joshi and J. Xu, "High efficient video coding (HEVC) screen content coding: Draft 2," JCTVC-S1005, Section 7.4.9.6," the semantics of palette_share_flag are stated as "palette_share_flag[x0][y0] equal to 1 specifies that the palette for the current coding unit is derived by copying the first PreviousPaletteSize entries from the predictor palette. The variable PreviousPaletteSize is derived as specified in subclause 8.4.5.2.8. palette_share_flag [x0][y0] equal to 0 specifies the palette for the current coding unit is specified as a combination of palette entries from previous coding units and new palette entries which are explicitly signaled."

In one example, when the value of the palette_share_flag is equal to 1, the palette_share_flag indicates that the current block may reuse the last coded palette from the previously coded block. This method is also known as palette sharing. However, new research results indicate that this flag, together with the palette sharing method it represents, is not effective in improving coding efficiency, while also introducing additional parsing and decoding complexity.

Further, some redundancies are identified in the signaling process for a syntax element that indicates a run type, such as palette_run_type_flag. Specifically, when the current pixel is the first pixel in a line in a scanning order, and a pixel neighboring the current pixel and above the current pixel is available, the current pixel cannot be in "copy above" mode. The term "above pixel is available" means the above neighbor is within the current block for horizontal scanning or the left neighbor is within the block for vertical scanning order if the "copy from outside" methods are not enabled. When the "copy from outside" methods are enabled, the "above pixel" may always be available for each pixel within the block. Example "copy from outside" methods are described in Y.-C. Sun, J. Kim, T.-D. Chuang, Y.-W. Chen, S. Liu, Y.-W. Huang, and S. Lei, "Non-CE6: Cross-CU palette colour index prediction," JCTVC-50079 and J. Kim, Y.-C. Sun, S. Liu, T.-D. Chuang, Y.-W. Chen, Y.-W. Huang, and S. Lei, "CE6-related: Enabling copy above mode prediction at the boundary of CU," JCTVC-S0114.

If the current pixel is coded according to "copy above" mode, then the current pixel's index equals the index of the current pixel's above neighbor. Contrarily, due to the rule that "copy above" mode cannot be immediately followed by another "copy above" mode, the above neighbor must be the end of a 'copy index' run. Therefore, the above neighbor's "copy index" run can be lengthened by at least 1 by adding the current pixel into the "copy index" run instead of making the current pixel the first pixel of a "copy above" run. Thus it is possible to normatively disable "copy above" mode, if the current pixel is the first pixel in a line in a scanning order.

This results in bit savings since, for such a pixel, the run type may be inferred to be "copy index", thus eliminating the need to signal such an index.

Further, the current binarization for syntax element palette_num_signalled_entries is in truncated unary code. The palette_num_signalled_entries syntax element indicates the number of entries in the current palette (e.g., a palette to be used to code the current block of video data) that are explicitly signaled. The number of samples that are explicitly signaled may be determined by the difference between the number of entries in the palette subtracted from the number of entries in the palette that are predicted from the palette of another block of video data (including any palette entries that indicate the use of an escape sample). In some examples, the palette_num_signalled_entries syntax element may be named the num_signalled_palette_entries syntax element.

In some examples, the codeword used to code the value of the palette_num_signalled_entries syntax element may be undesirably long, which may result in codewords of length greater than 32. For example, in HEVC1, all codewords are of length 32 or less. The same situation may also occur when coding the value of the palette_predictor_run syntax element. The palette_predictor_run syntax element specifies the number of zeros that precede a non-zero entry in the array predictor_palette_entry_reuse_flag. The predictor_palette_entry_reuse_flag indicates whether or not a particular palette entry from one or more previously-used palettes is reused for the current palette. The value of palette_predictor_run may range from 0 to the maximum palette predictor size, inclusive.

In view of these drawbacks, in one example of the disclosure, this disclosure proposes that video encoder 20 and video decoder 30 be configured to perform a palette-based coding mode without palette-sharing techniques. More specifically, video encoder 20 and video decoder 30 may be configured to perform palette-based coding without using the palette_share_flag[x0][y0] syntax element, as indicated below:

<deleted> palette_share_flag[x0][y0] ac(v)
if(!palette_share_flag[x0][y0]){ 1) </deleted>

Instead of using palette sharing techniques, video encoder 20 and video decoder 30 may be configured to code a palette for use with one more blocks of video data using other techniques, such as palette prediction techniques described above. In other examples, video encoder 20 and/video decoder 30 may be configured to perform palette prediction using the following techniques.

Figure 4:
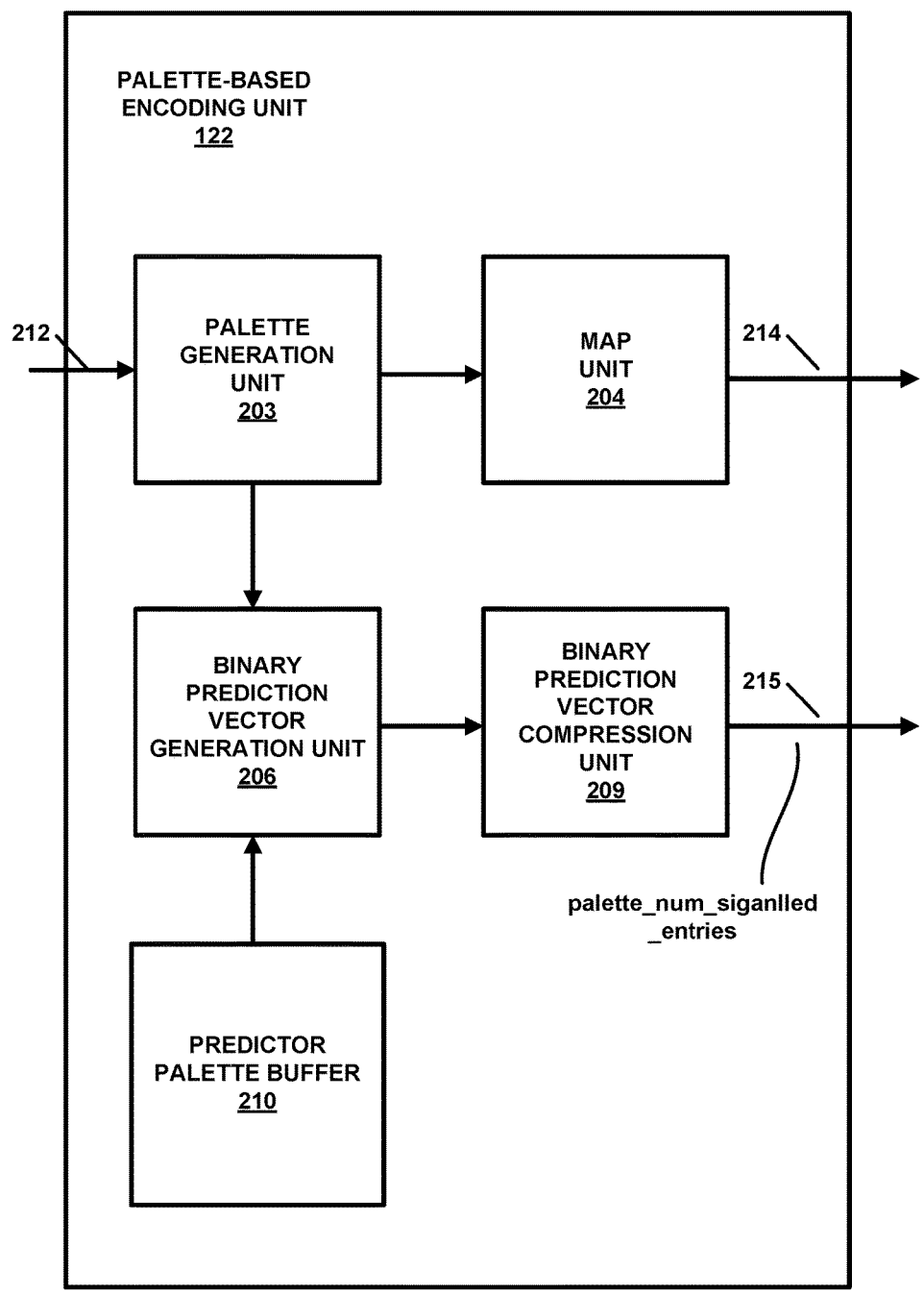
FIG. 4 is a block diagram illustrating an example palette-based encoding unit of the video encoder of FIG. 2.

FIG. 4 is a block diagram showing palette-based encoding unit 122 of video encoder 20 in more detail. Palette-based encoding unit 122 may be configured to perform one or more of the example techniques of this disclosure for palette-based video coding.

As described above, palette-based encoding unit 122 may be configured to encode a block of video data (e.g., a CU or PU) with a palette-based encoding mode. In a palette-based encoding mode, a palette may include entries numbered by an index and representing color component values (for example, RGB, YUV etc.) or intensities which may be used to indicate pixel values. Palette generation unit 203 may be configured to receive pixel values 212 for a current block of video data and generate a palette of color values for the current block of video data. Palette generation unit 203 may use any techniques for generating a palette for a current block of video data, including the histogram-based techniques discussed above. Palette generation unit 203 may be configured to generate a palette of any size. In one example, palette generation unit 203 may be configured to generate 32 palette entries, where each palette entry includes pixel values for the Y, Cr, and Cb components of a pixel. In the former example, it is assumed that each palette entry specifies the values for all color components of a sample (pixel). However, the concepts described in this document are applicable to using a separate palette for each color component.

Once a palette is generated by palette generation unit 203, map unit 204 may generate a map for the current block of video data that indicates whether or not a particular pixel in the current block of video data may be represented by an entry in the palette generated by palette generation unit 203. Map unit 204 may produce a map 214 that includes syntax elements that indicate how each pixel uses (or does not use) entries from the palette. As discussed above, in some examples, escape pixels are not signaled with a separate syntax element, but rather, may be indicated with a predetermined reserved index in a palette. If the value for a pixel in the current block of video data is not found in the palette, map unit 204 may indicate the use of an escape pixel with the reserved index in the palette and explicitly transmit a pixel value for that particular pixel. In some examples, map unit 204 may predict the explicit pixel value from one of the entries found in the palette. In some other examples, map unit 204 may quantize the pixel and transmit the quantized values.

In addition to signaling syntax elements that indicate the color values used for each of the pixels in a block, palette-based encoding unit 122 may also be configured to signal the palette that is to be used for a current block of video data. In accordance with the techniques of this disclosure, palette-based encoding unit 122 may be configured to employ palette prediction techniques to reduce the amount of data that is signaled to indicate the values of a palette for a particular block of video data.

As one example of palette prediction, as is described in JCTVC-Q0094, which is available as of Jun. 20, 2014 from http://phenix.int-evry.fr/jct/doc_end_user/documents/17_Valencia/wg11/JCTVC-Q0094-v1.zip, a palette may include entries that are copied from a predictor palette. A predictor palette may include palette entries from previously-coded blocks that use palette mode or from other reconstructed samples. As shown in FIG. 4, palette-based encoding unit 122 may include a predictor palette buffer 210. Predictor palette buffer 210 may be configured to store a number of previously-used palette entries from previously-encoded blocks. As one example, predictor palette buffer 210 may be configured as a first-in, first-out (FIFO) buffer of a predetermined size. Predictor palette buffer 210 may be of any size. In one example, predictor palette buffer 210 includes up to 64 previously-used palette entries.

In some examples, palette-based encoding unit 122 may be configured to prune the entries in predictor palette buffer 210 such that all palette entries in predictor palette buffer 210 are unique. That is, for each new palette entry to be added to predictor palette buffer 210, palette-based encoding unit 122 may be configured to first check that there are no other identical entries already stored in predictor palette buffer 210. If there are no identical entries, the new palette entry is added to predictor palette buffer 210. If the new entry is a duplicate of an existing entry, the new palette entry is added to predictor palette buffer 210 and the duplicated entries are removed from predictor palette buffer 210.

Palette-based encoding unit 122 may include a binary prediction vector generation unit 206 that is configured to generate and signal a binary flag (e.g., predictor_palette_entry_reuse_flag), for each entry in a palette for a current block of video data generated by palette generation unit 203, to indicate whether a palette entry in predictor palette buffer 210 is copied (or reused) for one of the entries in the palette for the current block of video data (e.g., indicated by flag=1). That is, a flag with a value of 1 in the binary predictor vector indicates that the corresponding entry in predictor palette buffer 210 is reused for the palette for the current block, while a flag with a value of 0 in the binary prediction vector indicates that the corresponding entry in the predictor palette buffer 210 is not reused for the palette for the current block. Additionally, palette-based encoding unit 122 may be configured to explicitly signal some values for the current palette that cannot be copied from entries in the predictor palette buffer 210. The number of new entries may be signaled as well. In this regard, video encoder 20 and/or video decoder 30 may be configured to signal the number of explicitly signaled palette entries using the palette_num_signalled_entries syntax element.

When using a palette-based coding mode that uses palette prediction techniques, video encoder 20 and video decoder 30 may be configured to code, among other syntax elements, a syntax element that indicates the number of palette entries that are explicitly signaled for a current palette to be used to code the current block of video data (e.g., palette_num_signalled_entries). This disclosure proposes techniques to improve the coding efficiency or restrict the codeword length when coding such a syntax element.

In one example of the disclosure, palette-based encoding unit 122 may be configured to encode the first bin of a syntax element that indicates a number of entries in a current palette that are explicitly signaled, such as the palette_num_signalled_entries syntax element, using a CABAC context. Palette-based encoding unit 122 may code other bins of the palette_num_signalled_entries using other encoding techniques. In another example of the disclosure, palette-based encoding unit 122 may be configured to use more than one context to code the first bin of the palette_num_signalled_entries syntax element. In one example, palette-based encoding unit 122 may be configured to determine the contexts based on a block size of the current video block being coded and/or based on the value of other syntax elements.

In accordance with one example of the disclosure, palette-based encoding unit 122 may be configured to determine a first bin of a first syntax element that indicates a number of entries in a current palette that are explicitly signaled. Video encoder 20 may be further configured to encode a bitstream that includes the first syntax element. The bitstream also may not include a second syntax element that indicates a palette sharing mode. In some examples, palette-based encoding unit 122 may be configured to encode the first bin of the first syntax element using a context-adaptive binary arithmetic coding. In other examples, palette-based encoding unit 122 may be configured to encode the first bin of the first syntax element using one or more contexts. In some examples of using one or more contexts, the one or more contexts may be based on at least one of a predicted number of palate coding entries or a block size.

In another example of the disclosure, to avoid the codeword length of palette_num_signalled_entries to grow longer than 32 bits, it is proposed that normative semantic changes are made to current palette coding techniques (e.g., R. Joshi and J. Xu, "High efficient video coding (HEVC) screen content coding: Draft 2," JCTVC-S1005). For example, the feasible values of a syntax element that specifies the maximum allowed palette size, such as palette_max_size, and a syntax element that specifies the maximum predictor palette size, such as palette_max_predictor_size, may be capped by a threshold. Such a threshold may be predetermined and stored in a memory (e.g., video data memory 98 in FIG. 2 or video data memory 148 in FIG. 3) that is accessible by palette-based encoding unit 122. Specifically, for palette_max_size, the value may be any value from 0 to T1, inclusive, where T1 is the threshold. When not present, palette-based encoding unit 122 may be configured to infer the value of palette_max_size to be 0. Further, for palette_max_predictor_size, the value may be any value from 0 to T2, inclusive, where T2 is the threshold. When not present, palette-based encoding unit 122 may be configured to infer the value of palette_max_predictor_size to be 0.

In one example, T1 is equal to 4096 and T2 is equal to 8192. In another example, T1 is equal to 4095 and T2 is equal to 4095. In yet another example, T1 is equal to 4095 and T2 is equal to 8191.

As another example, this disclosure proposes that the value of palette_max_size be equal to the number of pixels in the largest size coding unit. Such a value may be predetermined and stored in a memory accessible by palette-based encoding unit 122. In some examples, the value of palette_max_predictor_size may be less than or equal to K*palette_max_size, where K is a positive constant. In some examples, K=2.

In another example, palette-based encoding unit 122 (e.g., using binary vector compression unit 209 or another structural component of video encoder 20, such as entropy encoding unit 118) may be configured to code the value of the palette_num_signalled_entries syntax element using one more coding techniques from the Golomb code family (e.g. Golomb-Rice code, Exponential Golomb code, Truncated Rice code, Unary code, etc.). In one example of the disclosure, palette-based encoding unit 122 is configured to encode the value of the palette_num_signalled_entries syntax element using an exponential Golomb code of order 0. In another example of the disclosure, palette-based encoding unit 122 is configured to encode the value of the palette_num_signalled_entries syntax element using a concatenation of a Truncated Rice (TR) code and an exponential Golomb code such as the one used in coefficient coding to code coeff_abs_level_remaining_syntax element in HEVC1.

An example of a concatenation of a TR code and an exponential Golomb code for Golomb Rice parameter of 0 is shown below:

| Symbol | binarization |
| --- | --- |
| 0 | 0 |
| 1 | 10 |
| 2 | 110 |
| 3 | 1110 |
| [4, 5] | 11110x |
| [6, 9] | 111110xx |
| [10, 17] | 1111110xxx |
| ... | |

Here x can take a value of 0 or 1. Similarly, the table below shows an example of a concatenated binarization used in the coding of paletteRun syntax element. This is a concatenation of a truncated Rice and truncated exponential Golomb code of order 0 for maximum run value of 7.

| symbol | binarization |
|---|---|
| 0 | 0 |
| 1 | 10 |
| [2, 3] | 110x |
| [4, 7] | 111xx |

Here x can take a value of 0 or 1.

Using one or more Golomb codes (e.g., such as an exponential Golomb code or a concatenation of TR code and an exponential Golomb code) to code the palette_num_signalled_entries syntax element provides a benefit compared to previous techniques for coding the value of the palette_num_signalled_entries syntax element. Previous techniques for coding the value of the palette_num_signalled_entries syntax element used a unary code. Use of a unary code resulted in the coded length of the palette_num_signalled_entries syntax element being larger than 32 bits in some circumstances. By using one or more Golomb codes to code the palette_num_signalled_entries syntax element, the techniques of this disclosure allow palette-based encoding unit 122 to encode the value of the palette_num_signalled_entries syntax element in a matter that keeps the coded length at or below some predetermined number of bits (e.g., 32 bits).

In another example, palette-based encoding unit 122 may be configured to code the value of the palette_num_signalled_entries syntax element using truncated version of a Golomb code family (e.g., truncated Golomb Rice code, truncated Exponential Golomb code, truncated Truncated Rice code, truncated Unary code, etc.). In another example of the disclosure, palette-based encoding unit 122 may be configured to code the value of the palette_num_signalled_entries syntax element using the same code used to code the paletteRun syntax element. In another example, palette-based encoding unit 122 may be configured to code the value of the palette_num_signalled_entries syntax element using the method used to code coeff_abs_level_remaining_syntax element in coefficient coding (e.g., concatenation of truncated Rice (TR) and exponential Golomb code). In accordance with this example, the TR parameter is preferred to be 0. In each of these examples, the particular truncated code is chosen such that the encoded length of the palette_num_signalled_entries syntax element is kept at or below 32 bits.

In another example, it is proposed to impose a restriction on the bitstream that palette_num_signalled_entries is equal to the number of pixels in the block. That is, palette-based encoding unit 122 may be configured to limit the possible value of the palette_num_signalled_entries syntax element by the number of pixels in the currently coded block. In another example, palette-based encoding unit 122 may be configured to limit the possible value of the palette_num_signalled_entries by the number of pixels in the largest possible block of a particular picture (e.g., the large block size defined by a particular video coding standard).

In another example, palette-based encoding unit 122 may be configured to bypass signaling a syntax element that indicates a run type, such as palette_run_type_flag, if the current pixel is the first pixel in the line in scanning order and the pixel neighboring the current pixel above the current pixel is available. In one example, palette-based encoding unit 122 may be configured to determine that a current pixel is a first pixel in a line in a scanning order. Palette-based encoding unit 122 may further determine that a neighboring pixel situated above the current pixel is available. In response to determining that the current pixel is the first pixel in the line in the scanning order and determining that the neighboring pixel situated above the current pixel is available, palette-based encoding unit 122 may be further configured to bypass encoding a first syntax element in a bitstream, wherein the first syntax element indicates a run type and encode a remainder of the bitstream.

Returning to FIG. 4 and palette prediction techniques of this disclosure, in U.S. application Ser. No. 14/667,411, filed Mar. 24, 2015, published as US Patent Publication No. 2015/0281728, a binary tree based signaling method and end-position based signaling methods were proposed for coding of the palette binary predictor vector. In U.S. Provisional Application No. 62/002,741, filed May 23, 2014, a group based signaling method was proposed. This disclosure proposes additional techniques for generating, encoding, and decoding the binary prediction vector.

Some examples described herein relate to methods to code the palette prediction vector to improve coding efficiency. For example, assume that the binary prediction vector generated by binary prediction vector generation unit 206 is denoted by:

$$b=[b_0, b_1, \ldots, b_{N-1}], N \geq 0, b_i \in \{0,1\}, 0 \leq i < N$$

In the equation above, $b_i \in \{0,1\}$, $0 \leq i < N$ denotes a prediction flag (also called a binary flag or binary prediction flag). If $N=0$, $b=\phi$ (i.e., b is the empty vector), which does not need to be signaled. Therefore, in the following description, it may be assumed that $N>0$.

FIG. 5 shows one example of a predictor palette buffer 210 and a current palette 220. As can be seen in FIG. 5, current palette 220 reuses pixel values from predictor palette buffer 210 associated with entry indices 1, 2, 5, and 9. As such, a binary predictor vector produced by binary prediction vector generation unit 206 of FIG. 4 would be b=[110010001000]. As can be seen in this example, the binary prediction, vector b includes flags with a value of 1 corresponding to the $1^{st}$, $2^{nd}$, $5^{th}$, and $9^{th}$ indices, in the predictor palette buffer 210. That is, the $1^{st}$, $2^{nd}$, $5^{th}$, and $9^{th}$ entries in predictor palette buffer 210 are the only entries reused for current palette 220. For entry indices 5-8 in current palette 220, palette-based encoding unit 122 may be configured to signal palette entry values in the encoded video bitstream (e.g., using explicit signaling or another prediction technique).

In accordance with one or more techniques of this disclosure, video encoder 20 may be configured to encode or generally encode the binary predictor vector b in order to reduce the amount of data needed to signal a palette in the encoded video bitstream. As shown in FIG. 4, binary prediction vector compression unit 209 may be configured to generate and signal encoded binary prediction vector 215. However, it should be understood that the binary prediction vector compression techniques of this disclosure may be implemented in other structures of video encoder 20, including entropy encoding unit 118 in FIG. 2.

Figure 6:
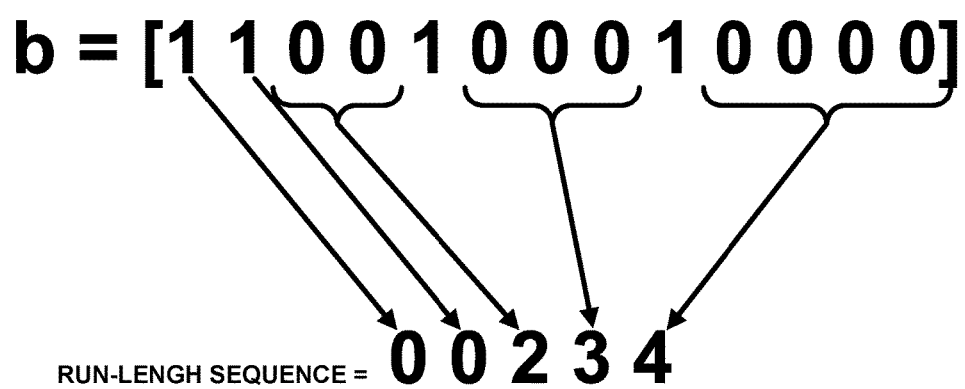
FIG. 6 is a conceptual diagram illustrating an example binary prediction vector encoding technique according to the techniques of the disclosure.

In one example of the disclosure, binary prediction vector compression unit 209 may be configured to encode the binary prediction vector using a run-length based encoding techniques. For example, binary prediction vector compression unit 209 may be configured to encode the binary prediction vector by signaling the number of consecutive '0s' between '1s' in the binary prediction vector using an Exponential-Golomb code. As an example, again assume that b=[110010001000]. In this example, as shown in FIG. 6, the binary prediction vector (i.e., b) can be expressed as: 'zero consecutive 0s'-'1'-'zero consecutive 0s'-'1'-'two consecutive 0s'-'1'-'three consecutive 0s'-'1'- and 'four consecutive 0s'. Because it is known that $b_i \in \{0,1\}$, except for the last 'consecutive 0' group, each 'consecutive 0' group must be followed by a '1'. Therefore, binary prediction vector compression unit 209 may use zero-based run-length coding techniques to represent the binary prediction vector b as 'zero consecutive 0'-'zero consecutive 0'-'two consecutive 0'-'three consecutive 0'-'four consecutive 0', which can be expressed as the run-length sequence '0-0-2-3-4'.

In accordance with one or more examples of this disclosure related to run-length based signaling, to code the run-length sequence, a Golomb-Rice code, Exponential-Golomb code of any order, Truncated Exponential-Golomb code, Truncated-Rice code or any other binarizations, including truncated binarizations, may be used. In one example, binary prediction vector compression unit 209 uses a 0-th order Exponential-Golomb code as the run-length coding technique.

For the truncated binarization, the maxsymbol can be the maximum possible value of the run depending on the position of '1' in the binary vector and the binary vector size, since, upon moving to the end of the binary vector, the maximum possible run value is reduced from the vector size to 0 depending on the position within the vector. For example, the max symbol can be the binary vector length or the binary vector length minus the position of the '1' from which the run is being counted. In, other words, it is the remaining length measured from the end of the binary vector. For the above example with the binary vector b of a particular size, e.g., 13, the run-length sequence '0-0-2-3-4' can be coded with the truncated binarization '0[13]-0[12]-2[11]-3[8]-4[4]', where the max symbol is provided in the brackets.

Also, in some examples, binarization may be dependent on the position or index of the element (0 or 1) in the binary vector. As a particular example, if the position is smaller than a certain threshold, one type of binarization is used; otherwise, another type of binarization is applied. In some examples, the binarization type can be different binarization codes, or the same code family but with different order, such as Exponential-Golomb code.

In one example, the threshold may be the palette length from the previous block or previous palette coded block. In another example, the threshold can be fixed to some default value or signaled per block, slice, picture or elsewhere. It is to be recognized that a corresponding technique may optionally be used to define a CABAC context to code the run values. Additionally, palette-based encoding unit 122 (See FIG. 2) may be configured to stop run-length signaling when the number of signaled '1' elements (i.e., the number of palette entries from predictor palette buffer 210 indicated as being reused for the current palette 220) reaches a maximum possible number. In some examples, the maximum possible number is the maximum possible palette size.

Some examples of this disclosure relate to end position coding of the run-length sequence indicating the binary prediction vector b. In one or more examples of this disclosure, binary prediction vector compression unit 209 may be configured to encode the binary prediction vector b using a reserved run-length L to code the ending position of the binary prediction vector. In one example, L=1 is used as the reserved run-length. At video encoder 20, if the run-length is equal to or greater than L, binary prediction vector compression unit 209 is configured to add 1 to the run-length. If the actual run-length is less than L, binary prediction vector compression unit 209 is configured to signal the run-length as is. Binary prediction vector compression unit 209 may signal the end position run-length with the reserved run-length L.

Likewise, at video decoder 30, if the decoded value of a run-length is larger than L, 1 is subtracted from the actual run-length. If the decoded value or a run-length is smaller than L, the decoded value is used as the actual run-length. If the decoded value is equal to L, the remaining positions in the binary prediction vector b are all 0. Hence, if the decoded value is equal to L, no more run signaling is necessary.

Using the same example as above (i.e., b=[110010001000]) and assuming that L=1, binary prediction vector compression unit 209 is configured to signal the run-length sequence '0-0-2-3-4' of FIG. 6 as '0-0-3-4-1'. Then, applying the above rules, video decoder 30 may be configured to recover the run-length sequence as '0-0-2-3-end'. That is, the first run-length value of 0 is decoded as 0 and the next run-length sequence of 0 is decoded as 0, as both of the 0 run-length sequences are less than the reserved run-length value of L=1. The next run-length sequence is 3, and as such, video decoder 30 would be configured to subtract 1 from the value of 3 to obtain 2, because the received value of 3 is greater than the reserved run-length value of L=1. Likewise, video decoder 30 would be configured to subtract 1 from the received value of 4 to obtain 3 for next run-length sequence, because the received value of 4 is greater than the reserved run-length value of L=1. Finally, the last received run-length value 1 is equal to the reserved run-length value of L=1. Accordingly, video decoder 30 may determine that no further values of '1' are present in the binary prediction vector.

Figure 7:
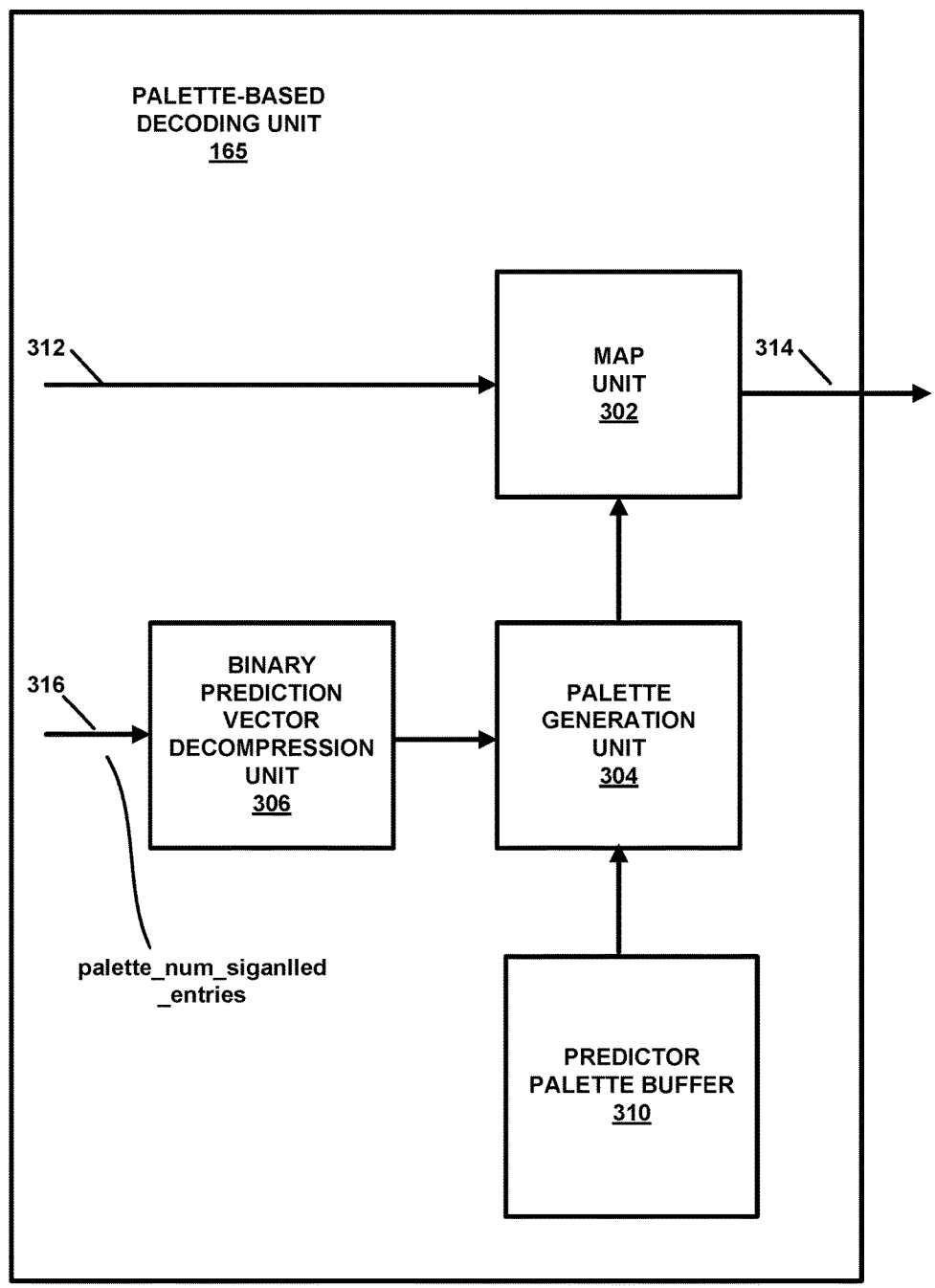
FIG. 7 is a block diagram illustrating an example palette-based decoding unit of the video encoder of FIG. 3.

FIG. 7 is a block diagram showing an example of palette-based decoding unit 165 of video decoder 30. Palette-based decoding unit 165 may be configured to perform in a reciprocal manner to palette-based encoding unit 122 of FIG. 4. Palette-based decoding unit 165 may be configured to receive a map 312 that indicates, for each pixel in a current block, whether or not entries for a palette will be used for the pixels in the current block. In addition, map 312 may further indicate what palette entries are to be used for a given pixel. Map unit 302 may decode the current block of video data using the map 312 and a palette generated by palette generation unit 304 to produce decoded video data 314.

In accordance with the techniques of this disclosure, palette-based decoding unit 165 may also receive an encoded binary prediction vector 316. As discussed above, binary prediction vector 316 may be encoded using a run-length coding technique that encodes a run-length sequence indicating a run of zero values in the binary prediction vector. Binary prediction vector decompression unit 306 may be configured to decode the encoded binary prediction vector 316 using any combination of the run-length coding techniques described above with reference to FIGS. 4-6. Once a binary prediction vector is recovered by binary prediction vector decompression unit 306, palette generation unit 304 may generate a palette for the current block of video data based on the binary prediction vector and previously-used palette entries stored in predictor palette buffer 310. Palette-based decoding unit 165 may be configured to store previously-used palette entries in predictor palette buffer 310 in the same manner that palette-based encoding unit 122 (see FIG. 2) stored previously-used palette entries in predictor palette buffer 210.

In one example of the disclosure, palette-based decoding unit 165 may be configured to decode the first bin of a syntax element that indicates a number of entries in a current palette that are explicitly signaled, such as the palette_num_signalled_entries syntax element, using a CABAC context. Palette-based decoding unit 165 may decode other bins of the palette_num_signalled_entries using other decoding techniques. In another example of the disclosure, palette-based decoding unit 165 may be configured to use more than one context to decode the first bin of the palette_num_signalled_entries syntax element. In one example, palette-based decoding unit 165 may be configured to determine the contexts based on a block size of the current video block being decoded and/or based on the value of other syntax elements.

In accordance with one example of the disclosure, palette-based decoding unit 165 may be configured to determine a first bin of a first syntax element that indicates a number of entries in a current palette that are explicitly signaled. Video decoder 30 may be further configured to decode a bitstream that includes the first syntax element. The bitstream also may not include a second syntax element that indicates a palette sharing mode. In some examples, palette-based decoding unit 165 may be configured to decode the first bin of the first syntax element co using a context-adaptive binary arithmetic coding. In other examples, palette-based decoding unit 165 may be configured to decode the first bin of the first syntax element using one or more contexts. In some examples of using one or more contexts, the one or more contexts may be based on at least one of a predicted number of palate coding entries or a block size.

In another example of the disclosure, to avoid the codeword length of palette_num_signalled_entries to grow longer than 32 bits, it is proposed that normative semantic changes are made to current palette coding techniques. For example, the feasible values of a syntax element that specifies the maximum allowed palette size, such as palette_max_size, and a syntax element that specifies the maximum predictor palette size, such as palette_max_predictor_size, may be capped by a threshold. Such a threshold may be predetermined and stored in a memory (e.g., video data memory 148 in FIG. 3) that is accessible by palette-based decoding unit 165. Specifically, for palette_max_size, the value may be any value from 0 to T1, inclusive, where T1 is the threshold. When not present, palette-based decoding unit 165 may be configured to infer the value of palette_max_size to be 0. Further, for palette_max_predictor_size, the value may be any value from 0 to T2, inclusive, where T2 is the threshold. When not present, palette-based decoding unit 165 may be configured to infer the value of palette_max_predictor_size to be 0.

In one example, T1 is equal to 4096 and T2 is equal to 8192. In another example, T1 is equal to 4095 and T2 is equal to 4095. In yet another example, T1 is equal to 4095 and T2 is equal to 8191.

As another example, this disclosure proposes that the value of palette_max_size be equal to the number of pixels in the largest size coding unit. Such a value may be predetermined and stored in a memory accessible by palette-based decoding unit 165. In some examples, the value of palette_max_predictor_size may be less than or equal to K*palette_max_size, where K is a positive constant. In some examples, K=2.

In another example, palette-based decoding unit 165 of FIG. 3 (e.g., using binary prediction vector decompression unit 306 or another structural component of video decoder 30, such as entropy decoding unit 150 of FIG. 3) may be configured to decode the value of the palette_num_signalled_entries syntax element using one more decoding techniques from the Golomb code family (e.g. Golomb-Rice code, Exponential Golomb code, Truncated Rice code, Unary code, etc.). In one example of the disclosure, palette-based decoding unit 165 is configured to decode the value of the palette_num_signalled_entries syntax element using a concatenation of truncated Rice and Exponential Golomb code.

In another example, palette-based decoding unit 165 may be configured to decode the value of the palette_num_signalled_entries syntax element using truncated version of a Golomb code family (e.g., truncated Golomb Rice code, truncated Exponential Golomb code, truncated Truncated Rice code, truncated Unary code, etc.). In another example of the disclosure, palette-based decoding unit 165 may be configured to decode the value of the palette_num_signalled_entries syntax element using the same code used to code the paletteRun syntax element. In another example, palette-based decoding unit 165 may be configured to decode the value of the palette_num_signalled_entries syntax element using the method of decoding coeff_abs_level_remaining_ syntax element in coefficient decoding (e.g., concatenation of Truncated Rice (TR) and exponential Golomb code). In accordance with this example, the TR parameter is preferred to be 0.

In another example, it is proposed to impose a restriction on the bitstream that palette_num_signalled_entries is equal to the number of pixels in the block. That is, palette-based decoding unit 165 may be configured to limit the possible value of the palette_num_signalled_entries syntax element by the number of pixels in the currently coded block. In another example, palette-based decoding unit 165 may be configured to limit the possible value of the palette_num_signalled_entries by the number of pixels in the largest possible block of a particular picture (e.g., the large block size defined by a particular video coding standard).

In another example, palette-based decoding unit 165 may be configured to infer value of a syntax element that indicates a run type, such as palette_run_type_flag, if the current pixel is the first pixel in the line in scanning order and the pixel neighboring the current pixel above the current pixel is available. In one example, palette-based decoding unit 165 may be configured to determine that a current pixel is a first pixel in a line in a scanning order. Palette-based decoding unit 165 may further determine that a neighboring pixel situated above the current pixel is available. In response to determining that the current pixel is the first pixel in the line in the scanning order and determining that the neighboring pixel situated above the current pixel is available, palette-based decoding unit 165 may be further configured to infer the value of the first syntax element in a bitstream, wherein the first syntax element indicates a run type and encode a remainder of the bitstream.

Figure 8:
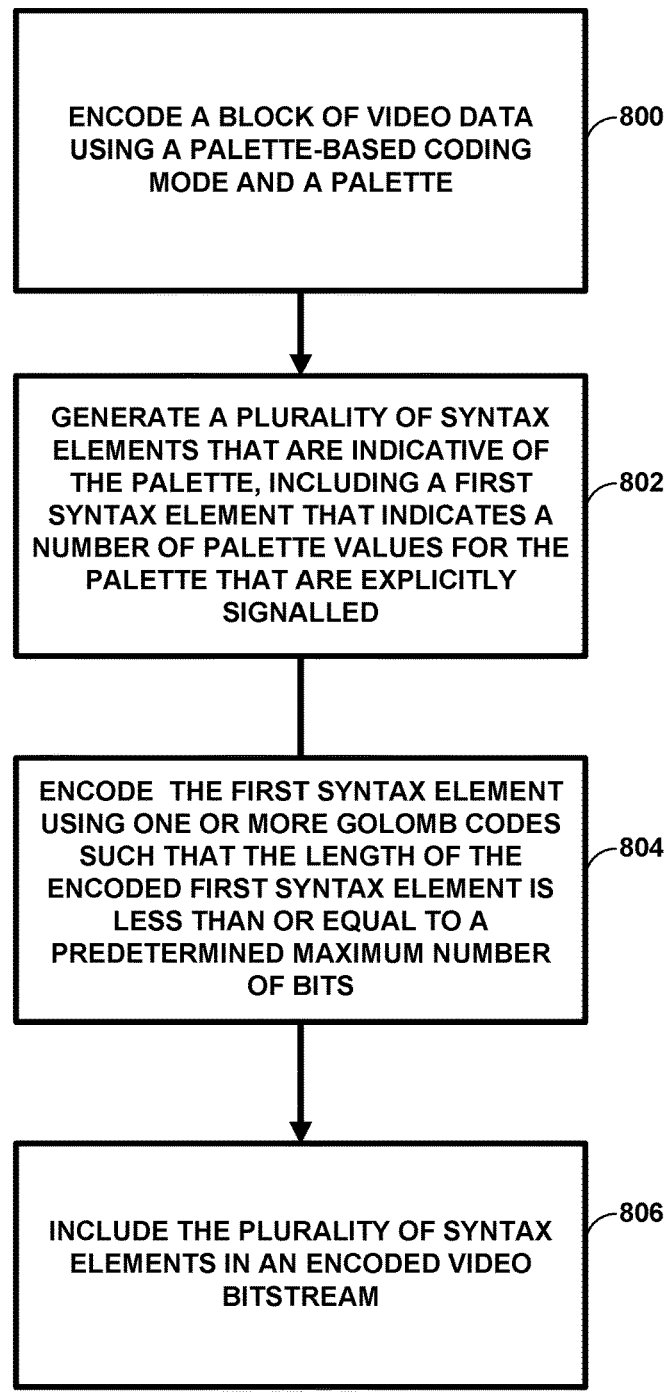
FIG. 8 is a flowchart illustrating an example video encoding method according to the techniques of the disclosure.

FIG. 8 is a flowchart illustrating an example video encoding method according to the techniques of the disclosure. The techniques of FIG. 8 may be implemented by one or more hardware structures of video encoder 20, including palette-based encoding unit 122 and/or entropy encoding unit 118 (see FIG. 2).

In one example of the disclosure, video encoder 20 may be configured to encode a block of video data using a palette-based coding mode and a palette (800), and generate a plurality of syntax elements that are indicative of the palette that was used to encode the block of video data, the plurality of syntax elements including a first syntax element that indicates a number of palette values for the palette that are explicitly signaled in the encoded video bitstream (802). Video encoder 20 may be further configured to encode the first syntax element using one or more Golomb codes such that the length of the encoded first syntax element is less than or equal to a predetermined number of bits (804), and include the plurality of syntax elements in an encoded video bitstream (806).

In one example of the disclosure, the first syntax element is a palette_num_signalled_entries syntax element. In another example of the disclosure, the plurality of syntax elements includes the palette values indicated as being explicitly signaled by the first syntax element.

In one example of the disclosure, the predetermined maximum number of bits is 32, and the one or more Golomb codes is an exponential Golomb code of order 0. In another example of the disclosure, the predetermined maximum number of bits is 32, and the one or more Golomb codes is a concatenation of a truncated Rice code and an exponential Golomb code.

In another example of the disclosure, a maximum value of the first syntax element is defined relative to a second syntax element that indicates a maximum size of the palette, and a third syntax element that indicates a maximum size of a palette predictor. In this example, video encoder 20 may be further configured to define the second syntax element to be a value from 0 to a first threshold, and define the third syntax element to be a value from 0 to a second threshold. In one example, the first threshold is one of 4095 or 4096 and the second threshold is one of 4095, 8191, or 8192.

In another example of the disclosure, a maximum value of the first syntax element is defined relative to a second syntax element that indicates a maximum size of the palette, and a third syntax element that indicates a maximum size of a palette predictor. In this example, video encoder 20 may be further configured to define the second syntax element to be less than or equal to a number of pixels in a largest possible block in the encoded video bitstream, and define the third syntax element to be less than or equal to K*a value of the second syntax element, where K is a positive constant. In one example, K is 2.

In another example of the disclosure, video encoder 20 may be further configured to signal a syntax element indicating a palette run type in the case that a current pixel is not a first pixel in a scanning order, and not signal the syntax element indicating a palette run type in the case that the current pixel is the first pixel in the scanning order and the previous pixel/sample is available.

Figure 9:
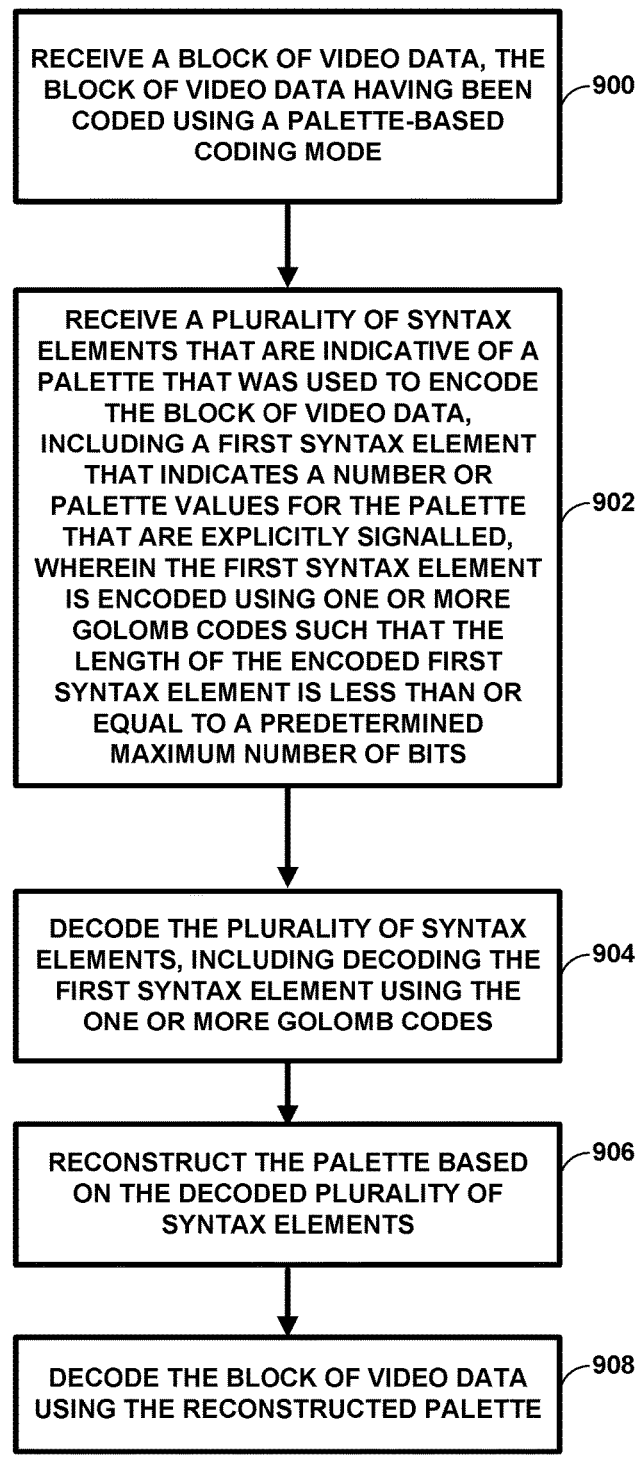
FIG. 9 is a flowchart illustrating an example video decoding method according to the techniques of the disclosure.

FIG. 9 is a flowchart illustrating an example video decoding method according to the techniques of the disclosure. The techniques of FIG. 9 may be implemented by one or more hardware structures of video decoder 30, including palette-based decoding unit 165 and/or entropy decoding unit 150 (see FIG. 3).

In one example of the disclosure, video decoder 30 may be configured to receive a block of video data in an encoded video bitstream, the block of video data having been encoded using a palette-based coding mode (900), and receive a plurality of syntax elements that are indicative of a palette that was used to encode the block of video data, the plurality of syntax elements including a first syntax element that indicates a number of palette values for the palette that are explicitly signaled in the encoded video bitstream, wherein the first syntax element is encoded using one or more Golomb codes such that the length of the encoded first syntax element is less than or equal to a predetermined maximum number of bits (902). Video decoder 30 may be further configured to decode the plurality of syntax elements, including decoding the first syntax element using the one or more Golomb codes (904), reconstruct the palette based on the decoded plurality of syntax elements (906), and decode the block of video data using the reconstructed palette (908). Video decoder 30 may be further configured to display the decoded block of video data.

In one example of the disclosure, the first syntax element is a palette_num_signalled_entries syntax element. In another example of the disclosure, the plurality of syntax elements includes the palette values indicated as being explicitly signaled by the first syntax element.

In one example of the disclosure, the predetermined maximum number of bits is 32, and the one or more Golomb codes is an exponential Golomb code of order 0. In another example of the disclosure, the predetermined maximum number of bits is 32, and the one or more Golomb codes is a concatenation of a truncated Rice code and an exponential Golomb code.

In another example of the disclosure, a maximum value of the first syntax element is defined relative to a second syntax element that indicates a maximum size of the palette, and a third syntax element that indicates a maximum size of a palette predictor. In this example, video decoder 30 may be further configured to define the second syntax element to be a value from 0 to a first threshold, and define the third syntax element to be a value from 0 to a second threshold. In one example, the first threshold is one of 4095 or 4096 and the second threshold is one of 4095, 8191, or 8192.

In another example of the disclosure, a maximum value of the first syntax element is defined relative to a second syntax element that indicates a maximum size of the palette, and a third syntax element that indicates a maximum size of a palette predictor. In this example, video decoder 30 may be further configured to define the second syntax element to be less than or equal to a number of pixels in a largest possible block in the encoded video bitstream, and define the third syntax element to be less than or equal to K*a value of the second syntax element, where K is a positive constant. In one example, K is 2.

In another example of the disclosure, video decoder 30 may be further configured to receive a syntax element indicating a palette run type in the case that a current pixel is not a first pixel in a scanning order, and infer the syntax element indicating a palette run type in the case that the current pixel is the first pixel in the scanning order.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method of decoding video data, the method comprising:
receiving a block of video data in an encoded video bitstream, the block of video data having been encoded using a palette-based coding mode;
receiving a plurality of syntax elements that are indicative of a palette that was used to encode the block of video data, the plurality of syntax elements including a first syntax element that indicates a number of palette values for the palette that are explicitly signaled in the encoded video bitstream, wherein a maximum value of the first syntax element is defined relative to one or more of a second syntax element that indicates a maximum size of the palette or a third syntax element that indicates a maximum size of a palette predictor, wherein the second syntax element has a value from 0 to a first threshold and the third syntax element has a value from 0 to a second threshold, and encoded using one or more Golomb codes such that the length of the encoded first syntax element is less than or equal to a predetermined maximum number of bits;
decoding the plurality of syntax elements, including decoding the first syntax element using the one or more Golomb codes;
reconstructing the palette based on the decoded plurality of syntax elements; and
decoding the block of video data using the reconstructed palette.

2. The method of claim 1, wherein the first syntax element is a num_signalled_palette_entries syntax element.

3. The method of claim 1, wherein the predetermined maximum number of bits is 32, and wherein the one or more Golomb codes is an exponential Golomb code of order 0.

4. The method of claim 1, wherein the predetermined maximum number of bits is 32, and wherein the one or more Golomb codes is a concatenation of a truncated Rice code and an exponential Golomb code.

5. The method of claim 1, wherein the plurality of syntax elements includes the palette values indicated as being explicitly signaled by the first syntax element.

6. The method of claim 1, wherein the maximum value of the first syntax element is defined relative to both of the second syntax element that indicates the maximum size of the palette and the third syntax element that indicates the maximum size of the palette predictor.

7. The method of claim 1, wherein the first threshold is one of 4095 or 4096 and the second threshold is one of 4095, 8191, or 8192.

8. The method of claim 1, wherein the maximum value of the first syntax element is defined relative to both of the second syntax element that indicates a maximum size of the palette and the third syntax element that indicates a maximum size of the palette predictor, the method further comprising:
defining the second syntax element to be less than or equal to a number of pixels in a largest possible block of the video data in the encoded video bitstream; and
defining the third syntax element to be less than or equal to K*a value of the second syntax element, where K is a positive constant and * indicates a multiplication operation.

9. The method of claim 8, wherein K is 2.

10. The method of claim 1, further comprising:
displaying the decoded block of video data.

11. The method of claim 1, further comprising:
receiving a syntax element indicating a palette run type in the case that a current pixel of the block of video data is not a first pixel in a scanning order of the block of video data; and
inferring the syntax element as indicating a palette run type in the case that the current pixel is the first pixel in the scanning order.

12. An apparatus configured to decode video data, the apparatus comprising:

a memory configured to store an encoded video bitstream; and a video decoder configured to:
receive a block of video data in the encoded video bitstream, the block of video data having been encoded using a palette-based coding mode;
receive a plurality of syntax elements that are indicative of a palette that was used to encode the block of video data, the plurality of syntax elements including a first syntax element that indicates a number of palette values for the palette that are explicitly signaled in the encoded video bitstream, wherein a maximum value of the first syntax element is defined relative to one or more of a second syntax element that indicates a maximum size of the palette or a third syntax element that indicates a maximum size of a palette predictor, wherein the second syntax element has a value from 0 to a first threshold and the third syntax element has a value from 0 to a second threshold, and encoded using one or more Golomb codes such that the length of the encoded first syntax element is less than or equal to a predetermined maximum number of bits;
decode the plurality of syntax elements, including decoding the first syntax element using the one or more Golomb codes;
reconstruct the palette based on the decoded plurality of syntax elements; and
decode the block of video data using the reconstructed palette.

13. The apparatus of claim 12, wherein the first syntax element is a num_signalled_palette_entries syntax element.

14. The apparatus of claim 12, wherein the predetermined maximum number of bits is 32, and wherein the one or more Golomb codes is an exponential Golomb code of order 0.

15. The apparatus of claim 12, wherein the predetermined maximum number of bits is 32, and wherein the one or more Golomb codes is a concatenation of a truncated Rice code and an exponential Golomb code.

16. The apparatus of claim 12, wherein the plurality of syntax elements includes the palette values indicated as being explicitly signaled by the first syntax element.

17. The apparatus of claim 12, wherein the maximum value of the first syntax element is defined relative to both of the second syntax element that indicates the maximum size of the palette and the third syntax element that indicates the maximum size of a palette predictor.

18. The apparatus of claim 12, wherein the first threshold is one of 4095 or 4096 and the second threshold is one of 4095, 8191, or 8192.

19. The apparatus of claim 12, wherein the maximum value of the first syntax element is defined relative to both of the second syntax element that indicates a maximum size of the palette and the third syntax element that indicates a maximum size of the palette predictor, and wherein the video decoder is further configured to:
define the second syntax element to be less than or equal to a number of pixels in a largest possible block of the video data in the encoded video bitstream; and
define the third syntax element to be less than or equal to K*a value of the second syntax element, where K is a positive constant and * indicates a multiplication operation.

20. The apparatus of claim 19, wherein K is 2.

21. The apparatus of claim 12, further comprising:
a display configured to display the decoded block of video data.

22. The apparatus of claim 12, wherein the video decoder is further configured to:
receive a syntax element indicating a palette run type in the case that a current pixel of the block of video data is not a first pixel in a scanning order of the block of video data; and
infer the syntax element as indicating a palette run type in the case that the current pixel is the first pixel in the scanning order.

23. An apparatus configured to decode video data, the apparatus comprising:
means for receiving a block of video data in an encoded video bitstream, the block of video data having been encoded using a palette-based coding mode;
means for receiving a plurality of syntax elements that are indicative of a palette that was used to encode the block of video data, the plurality of syntax elements including a first syntax element that indicates a number of palette values for the palette that are explicitly signaled in the encoded video bitstream, wherein a maximum value of the first syntax element is defined relative to one or more of a second syntax element that indicates a maximum size of the palette or a third syntax element that indicates a maximum size of a palette predictor, wherein the second syntax element has a value from 0 to a first threshold and the third syntax element has a value from 0 to a second threshold, and encoded using one or more Golomb codes such that the length of the encoded first syntax element is less than or equal to a predetermined maximum number of bits;
means for decoding the plurality of syntax elements, including decoding the first syntax element using the one or more Golomb codes;
means for reconstructing the palette based on the decoded plurality of syntax elements; and
means for decoding the block of video data using the reconstructed palette.

24. A non-transitory computer-readable storage medium storing instructions that, when executed, causes one or more processors of a device configured to decode video data to:
receive a block of video data in an encoded video bitstream, the block of video data having been encoded using a palette-based coding mode;
receive a plurality of syntax elements that are indicative of a palette that was used to encode the block of video data, the plurality of syntax elements including a first syntax element that indicates a number of palette values for the palette that are explicitly signaled in the encoded video bitstream, wherein a maximum value of the first syntax element is defined relative to one or more of a second syntax element that indicates a maximum size of the palette or a third syntax element that indicates a maximum size of a palette predictor, wherein the second syntax element has a value from 0 to a first threshold and the third syntax element has a value from 0 to a second threshold, and encoded using one or more Golomb codes such that the length of the encoded first syntax element is less than or equal to a predetermined maximum number of bits;
decode the plurality of syntax elements, including decoding the first syntax element using the one or more Golomb codes;
reconstruct the palette based on the decoded plurality of syntax elements; and
decode the block of video data using the reconstructed palette.

25. A method of encoding video data, the method comprising:
   encoding a block of video data using a palette and a palette-based coding mode;
   generating a plurality of syntax elements that are indicative of the palette that was used to encode the block of video data, the plurality of syntax elements including a first syntax element that indicates a number of palette values for the palette that are explicitly signaled in an encoded video bitstream;
   encoding the first syntax element using one or more Golomb codes such that the length of the encoded first syntax element is less than or equal to a predetermined maximum number of bits, wherein a maximum value of the first syntax element is defined relative to one or more of a second syntax element that indicates a maximum size of the palette or a third syntax element that indicates a maximum size of a palette predictor, wherein the second syntax element has a value from 0 to a first threshold and the third syntax element has a value from 0 to a second threshold; and
   including the plurality of syntax elements in the encoded video bitstream.

26. The method of claim 25, wherein the first syntax element is a num_signalled_palette_entries syntax element.

27. The method of claim 25, wherein the predetermined maximum number of bits is 32, and wherein the one or more Golomb codes is an exponential Golomb code of order 0.

28. The method of claim 25, wherein the predetermined maximum number of bits is 32, and wherein the one or more Golomb codes is a concatenation of a truncated Rice code and an exponential Golomb code.

29. The method of claim 25, wherein the plurality of syntax elements includes the palette values indicated as being explicitly signaled by the first syntax element.

30. The method of claim 25, wherein the maximum value of the first syntax element is defined relative to both of the second syntax element that indicates the maximum size of the palette and the third syntax element that indicates the maximum size of a palette predictor.

31. The method of claim 25, wherein the first threshold is one of 4095 or 4096 and the second threshold is one of 4095, 8191, or 8192.

32. The method of claim 25, wherein the maximum value of the first syntax element is defined relative to both of the second syntax element that indicates a maximum size of the palette and the third syntax element that indicates a maximum size of the palette predictor, the method further comprising:
   defining the second syntax element to be less than or equal to a number of pixels in a largest possible block of the video data in the encoded video bitstream; and
   defining the third syntax element to be less than or equal to K*a value of the second syntax element, where K is a positive constant and * indicates a multiplication operation.

33. The method of claim 32, wherein K is 2.

34. The method of claim 25, further comprising:
   signaling a syntax element indicating a palette run type in the case that a current pixel is not a first pixel in a scanning order; and
   not signaling the syntax element indicating a palette run type in the case that the current pixel of the block of video data is the first pixel in the scanning order of the block of video data.

35. An apparatus configured to encode video data, the apparatus comprising:
   a memory configured to store a block of video data; and
   a video encoder configured to:
      encode the block of video data using a palette and a palette-based coding mode;
      generate a plurality of syntax elements that are indicative of the palette that was used to encode the block of video data, the plurality of syntax elements including a first syntax element that indicates a number of palette values for the palette that are explicitly signaled in an encoded video bitstream;
      encode the first syntax element using one or more Golomb codes such that the length of the encoded first syntax element is less than or equal to a predetermined maximum number of bits, wherein a maximum value of the first syntax element is defined relative to one or more of a second syntax element that indicates a maximum size of the palette or a third syntax element that indicates a maximum size of a palette predictor, wherein the second syntax element has a value from 0 to a first threshold and the third syntax element has a value from 0 to a second threshold; and
      include the plurality of syntax elements in the encoded video bitstream.

36. The apparatus of claim 35, wherein the first syntax element is a num_signalled_palette_entries syntax element.

37. The apparatus of claim 35, wherein the predetermined maximum number of bits is 32, and wherein the one or more Golomb codes is an exponential Golomb code of order 0.

38. The apparatus of claim 35, wherein the predetermined maximum number of bits is 32, and wherein the one or more Golomb codes is a concatenation of a truncated Rice code and an exponential Golomb code.

39. The apparatus of claim 35, wherein the plurality of syntax elements includes the palette values indicated as being explicitly signaled by the first syntax element.

40. The apparatus of claim 35, wherein the maximum value of the first syntax element is defined relative to both of the second syntax element that indicates the maximum size of the palette and the third syntax element that indicates the maximum size of a palette predictor.

41. The apparatus of claim 35, wherein the first threshold is one of 4095 or 4096 and the second threshold is one of 4095, 8191, or 8192.

42. The apparatus of claim 35, wherein the maximum value of the first syntax element is defined relative to both of the second syntax element that indicates a maximum size of the palette and the third syntax element that indicates a maximum size of the palette predictor, and wherein the video encoder is further configured to:
   define the second syntax element to be less than or equal to a number of pixels in a largest possible block of the video data in the encoded video bitstream; and
   define the third syntax element to be less than or equal to K*a value of the second syntax element, where K is a positive constant and * indicates a multiplication operation.

43. The apparatus of claim 42, wherein K is 2.

44. The apparatus of claim 35, wherein the video encoder is further configured to:
   signal a syntax element indicating a palette run type in the case that a current pixel is not a first pixel in a scanning order; and
   not signal the syntax element indicating a palette run type in the case that the current pixel of the block of video data is the first pixel in the scanning order of the block of video data.

45. An apparatus configured to encode video data, the apparatus comprising:
- means for encoding a block of video data using a palette and a palette-based coding mode;
- means for generating a plurality of syntax elements that are indicative of the palette that was used to encode the block of video data, the plurality of syntax elements including a first syntax element that indicates a number of palette values for the palette that are explicitly signaled in an encoded video bitstream;
- means for encoding the first syntax element using one or more Golomb codes such that the length of the encoded first syntax element is less than or equal to a predetermined maximum number of bits, wherein a maximum value of the first syntax element is defined relative to one or more of a second syntax element that indicates a maximum size of the palette or a third syntax element that indicates a maximum size of a palette predictor, wherein the second syntax element has a value from 0 to a first threshold and the third syntax element has a value from 0 to a second threshold; and
- means for including the plurality of syntax elements in the encoded video bitstream.

46. A non-transitory computer-readable storage medium storing instructions that, when executed, causes one or more processors of a device configured to encode video data to:
- encode a block of video data using a palette and a palette-based coding mode;
- generate a plurality of syntax elements that are indicative of the palette that was used to encode the block of video data, the plurality of syntax elements including a first syntax element that indicates a number of palette values for the palette that are explicitly signaled in an encoded video bitstream;
- encode the first syntax element using one or more Golomb codes such that the length of the encoded first syntax element is less than or equal to a predetermined maximum number of bits, wherein a maximum value of the first syntax element is defined relative to one or more of a second syntax element that indicates a maximum size of the palette or a third syntax element that indicates a maximum size of a palette predictor, wherein the second syntax element has a value from 0 to a first threshold and the third syntax element has a value from 0 to a second threshold; and
- include the plurality of syntax elements in the encoded video bitstream.

* * * * *